PARALLEL STORAGE CONTROL SYSTEM

Filed May 1, 1968 8 Sheets-Sheet 1

INVENTORS.
DAVID L. BAHRS
ALBERT L. BEARD

Dec. 8, 1970 D. L. BAHRS ET AL 3,546,680

PARALLEL STORAGE CONTROL SYSTEM

Filed May 1, 1968 8 Sheets-Sheet 5

MAIN MEMORY TIMING SIGNAL WAVEFORMS

United States Patent Office 3,546,680
Patented Dec. 8, 1970

3,546,680

PARALLEL STORAGE CONTROL SYSTEM

David L. Bahrs, Parish, and Albert L. Beard, Liverpool, N.Y., assignors to Massachusetts Institute of Technology, Cambridge, Mass., a corporation of Massachusetts Filed May 1, 1968, Ser. No. 725,862
Int. Cl. G06f *13/00*
U.S. Cl. 340—172.5 18 Claims

ABSTRACT OF THE DISCLOSURE

A data processing system having a plurality of working store units with addressable locations for storing information and system components capable of communicating with any of the store units wherein separate control apparatus simultaneously selects, requests access and controls in parallel the transfer of information between a plurality of the store units and one of the components and wherein the control apparatus further simultaneously assigns in parallel manner consecutive addresses to different ones of the plural store units for scattering the information being transferred among the plural stores, thereby optimizing the rate of information transfer and the availability of each of the plural stores of the system.

BACKGROUND OF THE INVENTION

This invention relates to data processing systems and more particularly to apparatus for controlling access to the plural stores of a multistore arrangement for expediting the execution of data processing operations and the transfer of information in a data processing system.

One form of data processing system comprises at least one computer, a plurality of quick-access stores, and a plurality of peripheral control units each coupled to at least one peripheral device. In such a system various arithmetic, logical, or data transfer operations are performed simultaneously on information, each computer and control unit being adapted to obtain access to each store and being adapted to execute or control the execution of a sequence of these oepartions in a very short period of time. The information is supplied by the peripheral devices, which are adapted to rapidly supply information for the control units to control transferring between the stores and peripheral devices. To maintain a rapid rate of execution of these operations and maintain simultaneous operation of the stores and all system components, the computer must be able to rapidly retrieve information from the stores when needed and store the information after processing in the stores. The control units must also be able to rapidly retrieve and store information in the stores during information transfers between the stores and peripheral devices. Rapid retrieval and storage of the information is provided by the plurality of quick-access stores which collectively provide what is termed the "working store." Accordingly, each computer and control unit is competing with the other system components for immediate access to the working store and the system performance depends upon the number of accesses required and the rate of information transferred per access. In such a system, a computer executes a series of programs and the control units control the execution of parts of programs which are completely or partially stored in the working store.

All data processing operations are performed on operand words under control of instruction or control words of programs. An operand word represents a unit of information to be processed or information which is the result of processing. An instruction word, hereinafter referred to as an instruction, designates a particular operation for the computer to perform. A control word designates a particular type of peripheral operation or data transfer function for a peripheral control unit to control. Each control word also comprises a portion called an "address field" which identifies a specific location in one of the plural stores that contains instruction, control and operand words. One form of store has a plurality of addressable locations. Each addressable location stores a unit of information termed a word. The number of locations available in a store for the storage of words is limited by the physical size of the store, therefore additional memory locations are provided by adding physical storage units. Every available word location is identified by an address which specifies the position of a word in the working store.

The peripheral control unit gains access to working store locations by means of control words which are stored in the working store and transferred to the control unit in response to a computer executing a particular instruction. Once the control unit receives a control word it performs autonomously to provide for data transfer operations and control of a peripheral device. The computer gains access to working store locations by means of either an address field of an instruction or a sequential address source internal to the computer for autonomously retrieving and executing a succession of additional instructions to provide for data processing operations.

Each computer and control unit usually supplies or receives information at a rate asynchronous with respect to the operating rate of the working store units. Accordingly, it is common practice for each computer and control unit, upon requiring access to a working store for transferring information to or receiving information from a store, to provide a signal, known as an interrupt signal, for notifying the working store of the respective access requirement. The working store must respond to the interrupt signal by granting access to the computer or control unit for effecting the requisite data transfer. However, inasmuch as the working store units are shared by each computer and control unit, access to the store units is granted in a specific sequence or priority basis.

In such a data processing system, several working store units can be accessed for instructions and data independently such as a computer accessing one store unit and a peripheral control unit accessing a second memory to provide simultaneous operations. In such a system designed for simultaneous operations, the store access time is the limiting factor of the system speed. In order to provide improved performance, it is necessary that the operation of all the elements of the system be controlled so as to enable simultaneous operation of the stores and all system components a maximum percentage of the operating time. The efficiency of the system is therefore determined by the probability of availability of each store unit at the time of a request from a computer or control unit for access to a specific store to maintain continuous uninterrupted operation. To achieve a high degree of time efficiency it is therefore necessary to reduce the time required for accesses to each store and to transfer information at a maximum rate during each access.

One form of prior art data processing system employing a plurality of independent working store units improved system performance by providing a high degree of overlapping of operations. Overlapping is a form of concurrent working in which different phases of two consecutive instructions or control words are executed simultaneously, for example, the computer can perform an arithmetic operation while the following instruction is being read from the store into an instruction register and decoded. Overlapping is provided for example, in the case of sharing a common information transfer bus or common temporary buffer storage. The overlapping is implemented by sending a request for access to one store unit followed by a second request for access to a second store unit before the storage operation initiated by the first request is completed. The control for access to separate stores is therefore overlapped, however, the data transferred in response to the sequential requests must be sequentially supplied or received. Data is sequentially received by removing the information transferred in response to the first request from a bus or buffer storage prior to receiving the data transferred in response to the second request. Operations are therefore sequentially initiated and the response operations are sequentially controlled. A look-ahead control unit for predicting future memory access requirements and for providing queuing control for sequential access requests is also required. The degree of overlapping to achieve time efficiency is limited to the sequential response of each separate store following the receipt of sequential requests for access. The maximum rate of information transfer is also limited to the rate of individual sequential transfers. Extensive synchronization control is required in addition to the look-ahead control for sending individual requests for access sequentially and controlling responsive operations in the proper sequence for each store and time relationship for synchronous operation.

It is therefore an object of this invention to provide improved storage control apparatus for providing overlapping of storage operations.

It is therefore an object of this invention to provide apparatus for improving the rate of transfer of data in a data processing system.

It is still a further object of this invention to provide apparatus for reducing the time of access to any one store unit of a data processing system.

It is a further object of this invention to provide simplified apparatus for effecting the overlapping of successive store operations.

Another form of prior art data processing system employs a computer or peripheral control unit utilizing a program counter which supplies the address of a location in the working store containing each successive instruction or control word executed. Following each access to the working store, the counter is automatically incremented to provide a next consecutive address of a next instruction or control word. The instructions or control words must therefore be stored in and retrieved from locations having consecutive addresses.

In such a prior art data processing system, employing a plurality of working store units, a further advantage in overlapping operations is obtained by distributing requests for access among the plural store units of the system by assigning consecutive addresses to locations in different store units. This equalizes the load among the units and increases system performance by decreasing the competition and queuing of requests for the same unit. For example, when a system comprises two store units, consecutive addresses alternate between the two store units. The addresses are interleaved to increase the overlap; however, the same disadvantages are incurred as the previously described prior art overlapping since the addresses are sequentially interleaved. Requests for access to locations having consecutive addresses and located in different memories are provided sequentially and, as a result, the degree of overlap depends on the individual store response as well as the rate of sequential information transfer.

It is therefore an object of this invention to provide apparatus for providing improved distribution of consecutive addresses among a plurality of stores.

SUMMARY OF THE INVENTION

The foregoing objects are achieved, according to one embodiment of the instant invention, by providing in a data processing system storage control apparatus for automatically responding to information provided in a data control word, which simultaneously directs a request for access, an address, and a command to a plurality of separate selected working store units to control the working store units to execute a type of storage operation associated with a type of information transfer operation to be effected for each data control word.

The system of the instant invention includes at least one computer, at least one peripheral control unit, a large capacity auxiliary store, and a plurality of working stores. Each computer is an automatic data processing equipment unit which after it has been given an initial instruction is capable of operating on a series of instructions to generate a desired result and to provide a request for access to selected ones of the plurality of stores.

Each peripheral control unit is essentially an automatic data processing equipment unit, which after it has been given a data control word is capable of providing for control of a specific data input-output operation. A peripheral control unit of the system is coupled to each of the plurality of working stores and the auxiliary store to provide for controllable transmission of information between a plurality of the working stores and the auxiliary store.

In the data processing system, each computer and peripheral control unit has exclusive use of a control bus and a data transfer bus by which it can communicate with any working store in the system.

Each data control word includes an address field providing a partial representation of the working store address of the information to be transferred, and an address field providing a representation of the auxiliary store address of the information to be transferred. Each data control word includes, in addition to the address fields, a function portion. The function portion provides a function code which specifies such transfer functions as the direction of transfer, other transfer functions, or nontranfer functions. Associated with each direction of transfer function is a corresponding store operation, such as for example, the retrieval and storage operations of the working and auxiliary stores. The peripheral control unit responds to the function code of each control word to generate the required communication to each store for controlling a transfer operation.

The peripheral control unit of the instant invention, responds to data control word information to simultaneously select a plurality of working store units, and to generate and transmit an interrupt signal representing a request for access to each of the selected working store units. Since the control unit has exclusive use of separate control buses and separate data transfer buses to each working store unit, the interrupt signals are received simultaneously by each selected working store unit and under conditions, where each working store unit responds simultaneously, full overlap of control and parallel information transfer is attained.

The peripheral control unit includes sufficient buffer storage to accommodate information being transferred in parallel; therefore, delays due to sequential transfer of information are eliminated and the amount of information transferred in a given time period is increased. Slower speed working store units are thus employed in parallel to achieve higher rates of information transfer.

Assignment of consecutive addresses to locations in each of the plurality of selected working stores is provided by the peripheral control unit. The control unit derives a plurality of separate addresses, each having a different numerical value, from a partial address representation provided by the control word address field. The control unit adds additional binary digits to the partial address representation to derive a plurality of different consecutive addresses differing in numerical value by the number of words transferred to or from each working store during each access. The control unit then simultaneously transmits each address in parallel to a different one of the plurality of selected working stores.

Accordingly, the peripheral control unit of the instant invention responds to control word information to provide full parallel control of a plurality of working stores and an increased rate of transfer of information between working and auxiliary stores. The control unit also responds to control word information to simultaneously derive consecutive addresses and simultaneously transmit the consecutive addresses in parallel to separate working stores. The addresses are interleaved in parallel thereby increasing the rate of transfer of information which is stored in locations whose addresses are interleaved.

BRIEF DESCRIPTION OF THE DRAWING

This invention will be described with reference to the accompanying drawings wherein.

DESCRIPTION OF THE PREFERRED EMBODIMENT

Figure 1:
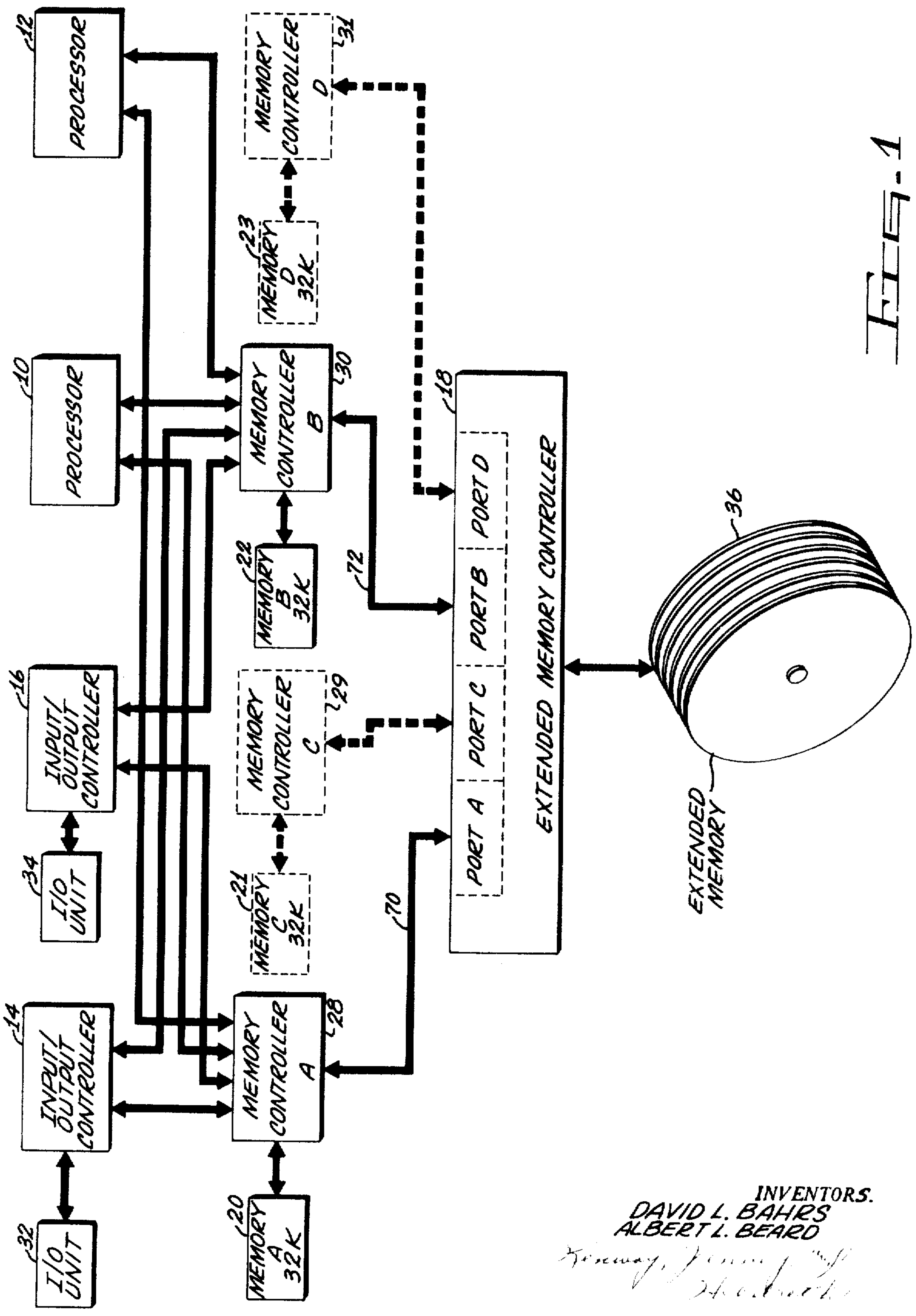
FIG. 1 is a block diagram of a multi-store data processing system embodying the instant invention.

The data processing system of FIG. 1 is adapted to process large amounts of information very rapidly by performing many different processing operations simultaneously under control of a plurality of programs completely or partially stored in a working store. Lines interconnecting the various components illustrated in FIG. 1 symbolically represent cables providing a plurality of conductors providing paths of data and control communication.

A working store to be referred to hereinafter as a main memory may comprise by way of example, memories 20 and 22. Main memory provides for storage of information which is available for immediate processing by the data processing system. An auxiliary store which may be, for example, extended memory 36 is provided as an extension of the main memory. Extended memory 36 provides storage for overflow information which cannot be contained within main memory. Memories 20 and 22 are quick-access low capacity memories which may be, for example, conventional random access magnetic core stores. Extended memory 36 may be, for example, a relatively slow-access high capacity conventional rotating magnetic disk or drum store.

Computers, which may be, for example, processors 10 and 12 are provided for performing the actual processing of information. Peripheral control units which may be, for example, input/output controllers 14 and 16 and extended memory controller 18 are provided for controlling the transfer of information between main memory and peripheral data handling units which may be I/O units 32 and 34, and extended memory 36 respectively. I/O units 32 and 34 represent external devices connected to input/output controllers 14 and 16 respectively to provide communication with the system of FIG. 1 under control of input/output controllers 14 and 16. The I/O units introduce new information into the data processing system or initiate particular data processing operations. For example, I/O units 32 and 34 may be such magnetic devices as magnetic tape handlers, punched card readers or communication terminal devices.

All information to be processed is either retrieved or stored in information units known as data words in memories 20 and 22 and processors 10 and 12. Data words may also be retrieved from or stored in memories 20 and 22 by input/out controllers 14 and 16 and extended memory controller 18.

Data words are units of information utilized by the system and comprise instruction and control words of programs and operand words representing information to be processed or information which is the result of processing. The processors and controllers respond to a series of instructions or control words known as a program to perform a particular data processing or transfer operation on operand words. The data word employed in the illustrated embodiment is composed of 36 binary digits.

Processors 10 and 12 and controllers 14, 16 and 18 are connected to memory controllers 28 and 30. Memory controllers 28 and 30 are each also connected to a respective one of memories 20 and 22.

Memory controllers 28 and 30 receive and schedule all communications between processors 10 and 12 and controllers 14, 16 and 18 and their respectively connected memories 20 and 22. The purpose of the memory controller is to enable communication between any one of memories 20 and 22 and any one of the processors or controllers. Each of memory controllers 28 and 30 are connected to all processors and controllers of the system, thereby making it possible for each processor or controller to have access to different ones of memories 20 and 22. The memory controller also makes it possible for each connected processor or controller to control different ones of memories 20 and 22.

Extended memory controller 18 functions as an automatic information transfer apparatus providing communication between memory controllers 28 and 30 and extended memory 36 for transferring information between memories 20 and 22 and extended memory 36 at a high data transfer rate. Extended memory controller 18 also functions as a controller for memory controllers 28 and 30 and extended memory 36 to simultaneously control the storage functions of retrieval and storage of information in memories 20 and 22 and extended memory 36. The extended memory controller of the actual embodiment includes eight memory ports, however, only four are illustrated for clarity in FIG. 1 and identified as port A, port B, port C, and port D. Up to eight memory controllers may be connected to extended memory controller 18 in the actual embodiment, each memory controller being connected to one of the memory ports. In FIG. 1 memory controller A is shown connected to port A of extended memory controller 18 and memory controller B is shown connected to port B of extended memory controller 18. Additional memory controllers 29 and 31 with respectively connected memories 21 and 23 may be connected to ports C and D respectively as illustrated.

Each of memories 20, 22 and 36 is an addressable memory wherein a storage location is explicitly and uniquely specified by means of an address. Only a single data word may be stored in an addressable location of memories 20 and 22 whereas a predetermined number of data words may be stored in an addressable location of memory 36. A data word is retrieved from or inserted into a storage location of the addressable memories only after such memory is supplied with the address of that location.

Extended memory controller 18 operates autonomously to control the execution of data control words, following initiation of operation, while the remainder of the system is available for other operations. The data control words are parts of programs performed under control of one of processors 10 or 12. For example, operation of extended memory controller 18 is initiated by processors 10 or 12 executing a particular type of instruction which results in supplying to extended memory controller 18, a data control word from one of memories 20 or 22. Extended memory controller 18 responds to the data control word hereinafter termed a "DCW" to automatically control both of memories 20 and 22 and extended memory 36 to provide different storage operations and transfer functions to transfer data between a number of successive locations in memories 20 and 22 and a location in extended memory 36. Processors 10 and 12 and input/output controllers 14 and 16 may continue independently executing different programs for controlling the execution of parts of programs respectively during data processing system operation.

The present invention is directed to improving the operation of the data processing system of FIG. 1 in transferring information between memories 20 and 22 and extended memory 36. Accordingly, the description of the mode of operation of the invention will be primarily directed to the operation of the system in the transferring of information between memories 20 and 22 and extended memory 36.

The address field of a DCW representing a partial address of a location in working store, is utilized by extended memory controller 18 to derive two separate actual addresses of successive locations in a pair of memories. Extended memory controller 18 adds six additional binary digits to the address field to derive an address representation for simultaneously selecting two memory ports for communicating with respectively connected memory controllers. By way of example, if the memory locations are divided among four separate memories A, B, C and D the address may be used to specify a pair of the ports such as ports A and B, ports C and D and so forth. The pair of ports selected by the address representation derived from the address field remain selected until another address field of another control word is received. In the system illustrated in FIG. 1 each of memories A, B, C and D have a capacity of 32,767 hereinafter referred to as 32K word locations. Extended memory controller 18 comprises address selection means which decode each derived address representation to simultaneously select two ports which results in the actual selection of two memory controllers, each memory controller corresponding to a respective one of the two selected ports. For example, an address representation representing an address of 0–65,535 would be decoded to provide for the selection of ports A and B and controllers 28 and 30 respectively and an address representation representing an address greater than 65,535 would be decoded to provide for selection of ports C and D and the respective controllers 29 and 31.

Figure 2:
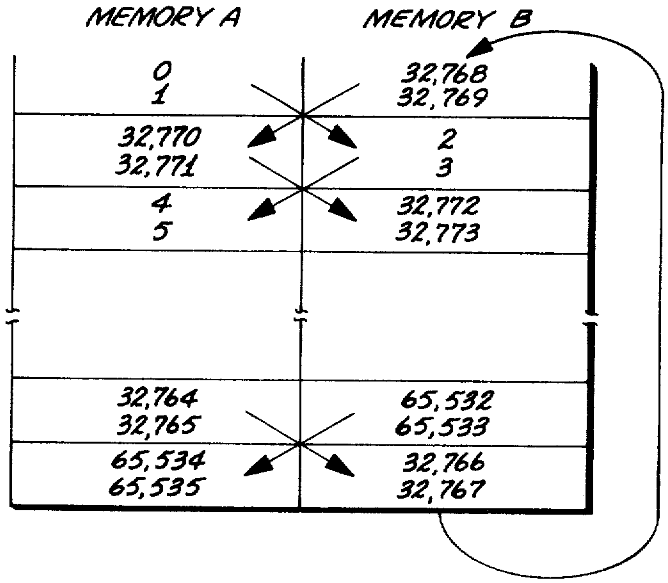
FIG. 2 is a representation of consecutive addresses for locations of memories A and B.

Extended memory controller 18 derives a separate address for applying to memory controllers 28 and 30 respectively. The first address representation is derived as previously described by adding six additional binary digits having a numerical value of 0 and the second address is derived by adding six binary digits having a numerical value of 2. The derived address representations represent consecutive addresses of locations in two memories such as memories A and B with each location being adapted to store two 36 bit words. By way of example, the first address representation is applied to memory controller A and the second address representation applied to memory controller B. These addresses are applied simultaneously thereby providing for simultaneously transmitting two separate addresses which are interleaved between memories A and B as illustrated in FIG. 2. Memory A will receive the addresses representing locations containing words 0–1, 4–5, 8–9, etc., while memory B will receive addresses representing locations containing words 2–3, 6–7, 10–11, etc. Consecutive address representations hereinafter referred to as addresses thereby alternate between memories A and B with the addresses applied simultaneously thereby providing addresses which are simultaneously interleaved in parallel. The more memory locations there are the longer the address must be. If the address length is limited, the number of memory locations usable in a particular pair of selected memories are limited and cannot exceed maximum. For example, assume that only 15 binary digits hereinafter referred to as bits are available for addressing locations in memory. The maximum decimal number represented by 15 bits is 32,767. If the first memory location is numbered 0 then only 32,768 may be specified by 15 address bits. Thus the address length fixes the maximum memory size. Each of memories 20 through 23 illustrated in FIG. 1 are as designated 32K each. The present invention improves the operation of providing addresses which are interleaved by providing addresses which are interleaved in parallel.

There will now be provided a summary description of the operation of a portion of the system of FIG. 1. When a program being executed by one of processors 10 or 12 specifies that communication is to be made between both of memories 20 and 22 and extended memory controller 18. One instance when such communication is required is when information which is not present in memories 20 and 22 must be transferred from extended memory 36 to memories 20 and 22. One of processors 10 or 12 upon executing a particular type of instruction termed a "connect" instruction requests information not currently in memories 20 and 22. When the processor executes the particular type of instruction, a DCW is supplied to memory controller 18 from one of memories 20 or 22 through memory controller 28 or 30.

Extended memory controller 18 responds to the address field of the DCW providing a partial representation of an address for deriving an address for selecting ports A and B for coupling memory controllers 28 and 30 to controller 18 through cables 70 and 72 respectively. Following selection of ports A and B, controller 18 simultaneously transmits an interrupt signal representing a request for access to memory controllers 28 and 30.

Controller 18 also responds to the address field of the DCW providing a partial representation of an address to derive two separate consecutive addresses representing a respective location in each of memories 20 and 22. A first address is derived by the addition of six binary digits providing the six least significant digits of the first address and having a numerical value of 0 to the partial representation. A second address is derived in a similar manner by the addition of six binary digits having a numerical value of 2 to the partial representation. Each DCW contains a function portion hereinafter referred to as a function code which determines the type of transfer function to be controlled by controller 18. Controller 18 responds to the function code of the DCW to control the type of information transfer such as the direction of information transfer between memory 20 and extended memory 36. Controller 18 also responds to the function code to simultaneously transmit control signals to memories 20, 22 and 36, to control the type of storage operation of each memory such as retrieval or storage which are to be referred to hereinafter as read or write operations respectively.

When the DCW specifies that information is to be transferred from memories 20 and 22 to extended memory 36, extended memory controller 18 simultaneously sends an address signal set and a control signal set specifying a read function to each of memory controllers 28 or 30 through cables 70 and 72 connected to selected ports A and B respectively and a control signal specifying a write operation accompanied by address signals to extended memory 36. Memory controllers 28 and 30 respond to the interrupt signals representing access requests to grant access to memories 20 and 22 by extended memory controller 18. Memory controllers 28 and 30 then initiate a read operation in each of memories 20 and 22 for retrieving two data words from two consecutively addressed locations in each memory commencing with the location addressed by the address applied from extended memory controller 18. The two data words are transferred one word at a time from memory controllers 28 and 30 to extended memory controller 18 until 4 words (2 words from each of memories 20 and 22) are received by controller 18. Extended memory 36 then retrieves the four data words from controller 18 and writes the four words into the location specified by the address supplied by the data control word. Extended memory 36 acknowledges receiving the four words by transmitting a signal to controller 18 signifying that four new words are needed for a next write operation.

While the data words are being written in extended memory 36, controller 18 automatically increments each of the addresses applied to controllers 28 and 30, and simultaneously transmits an interrupt signal to controllers 28 and 30 to initiate another retrieval operation for retrieving another two words from each of memories 20 and 22 from the locations specified by the incremented address. The sequence of operations is repeated until a predetermined number of words such as 64 data words have been transferred from 64 consecutively addressed locations represented by successive addresses which are interleaved in memories 20 and 22 and stored in a 64 word capacity location of extended memory 36. The writing operation is automatically terminated when the 64 words have been written into the address location of extended memory 36.

Extended memory 36 transmits a signal indicating that the end of a location adapted to store 64 data words has been reached and controller 18 responds to the signal to terminate the retrieval of data words from memories 20 and 22. Following each retrieval of two words from each of memories A and B, the addresses derived from the address field and applied to memory controllers 28 and 30 are simultaneously incremented by four.

A read operation specified by a data control word is executed by extended memory controller 18 in a manner similar to the preceding description for a write operation except that 64 data words are retrieved from extended memory 36 and transmitted for storage in memories 20 and 22.

Extended memory controller 18 responds to the address field of a control word to derive two separate addresses for applying two memory controllers 28 and 30 as previously described. Extended memory controller 18 automatically assigns consecutive addresses to locations in memories A and B with the consecutive addresses alternating between memories A and B. The actual embodiment of the system of FIG. 1 may be extended to include memories A, B, C and D with consecutive addresses rotating to each of the four memories. For example, a first address is applied to memory controller A representing word locations 0–1, a second address applied to memory controller B representing word locations 2–3, a third address applied to memory controller C representing word locations 4–5 and a fourth address applied to memory controller D representing word locations 6–7 etc. In the system comprised of four memories following the transfer of every four words between memories 20 and 22 and extended memory controller 18 the addresses would be incremented by four and applied to controllers 29 and 30 to represent locations in memories 21 and 23.

The data processing system of FIG. 1 processes information represented by the binary code. With the binary code each element of information is represented by a binary digit sometimes termed a bit. Each binary digit would be either a 1 or a 0. The unit of information primarily employed in processing is termed a data word and also sometimes termed a computer word. The data word in the system of FIG. 1 comprises 36 bits. Four types of data words are employed in this system: instruction words, operand words and two types of control words.

The operand word is a data word on which an arithmetic or logical operation is performed by processors 10 or 12 or which is the result of a data processing operation performed by a processor. Thus the operand word represents information which is to be processed and which is received from a memory by a processor or information which is the result of processing and which is transmitted to a memory by a processor.

The instruction word is employed to direct a discrete step in the data processing operation being executed by a processor. The instruction word is received brom a memory by a processor.

The control word is designated as a DCW as previously described. A DCW, FIG. 3, composed of two words, designated DCW1 and DCW2 hereinafter, are each composed of 36 binary coded bits of information. The first indicated 18 bits of DCW1 designated as bits 0–17 provide an address in extended memory 36 hereinafter referred to as extended memory address, and 18 bits designated 18–35 represent a partial address for deriving the beginning address of locations hereinafter referred to as "data address" in the memories 20 and 22 being adapted to store information which is to be transferred. DCW2 contains 36 bits, 18 bits designated 0–17 are used in control of an operation, an understanding of which is not material to an understanding of this invention. DCW2 also contains five bits designated 18–22 providing a function code to specify the type of operation to be performed by extended memory 36 during an information transfer as shown in the following table:

| Code: | Type of operation |
|---|---|
| 11000 | Read |
| 11010 | Write |

One bit desigated as bit 23 provides for control of an operation, an understanding of which is not material to an understanding of this invention. DCW2 also has 12 spare bits.

Figure 4:
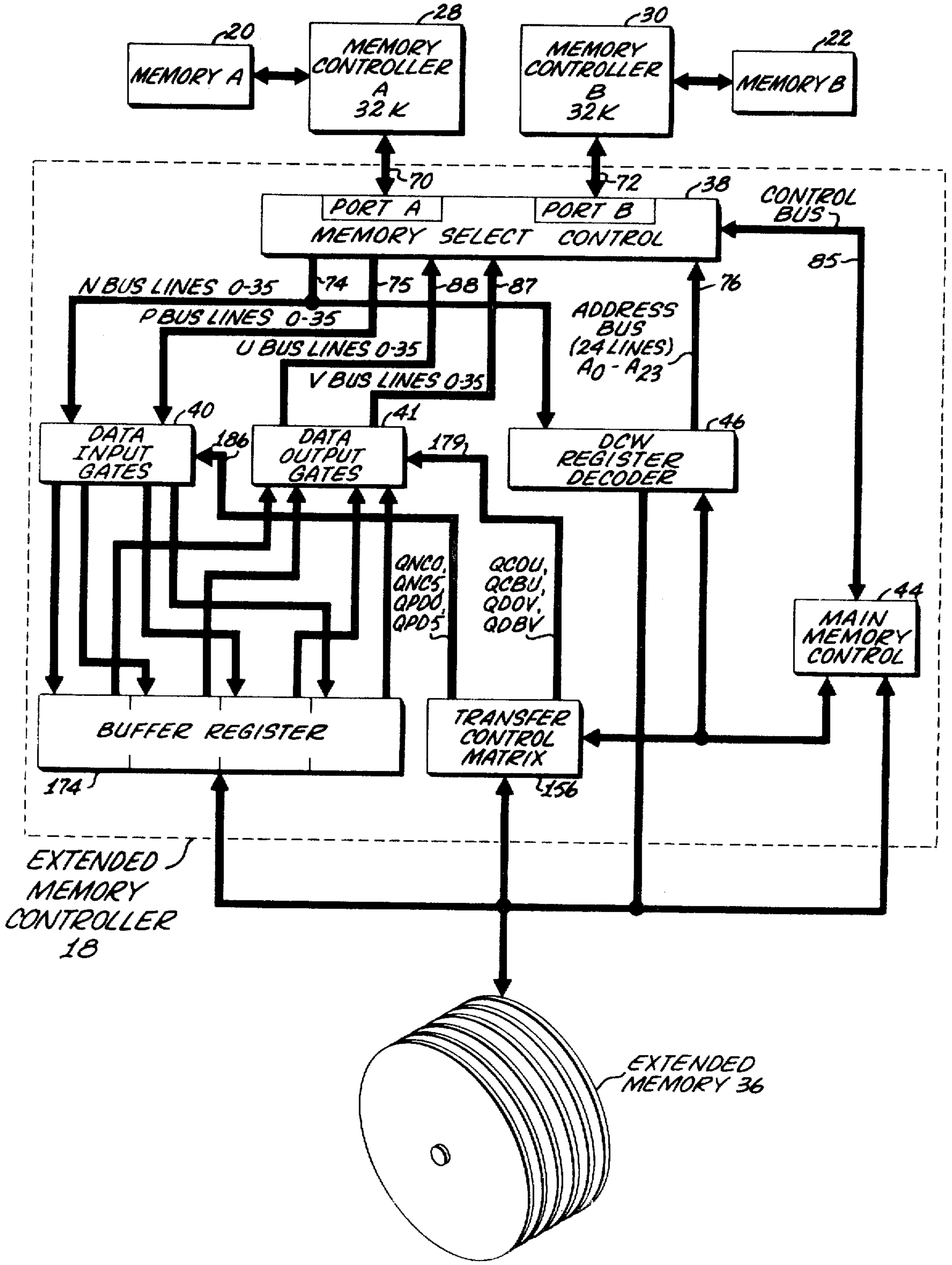
FIG. 4 is a block diagram illustrating in detail the instant invention.

A summary description of the operation of extended memory controller 18, FIG. 4, will now be provided. In response to a computer of the system of FIG. 1 executing a connect instruction, a DCW is supplied to extended memory controller 18 from one of memories 20 or 22, through memory select control 38 and N bus lines 0–35 for transfer to a DCW register decoder 46. The function code portion of the DCW is transferred to DCW register decoder 46 which senses the function to be controlled or determines the type of storage operation to be executed. Decoder 46 responds to the function code to generate a corresponding function signal. The extended memory controller responds to the function signal to provide for controlling a particular type of transfer function for receiving or transmitting data in a specified direction. Extended memory controller also responds to the function signal to generate storage control signals which are applied to both of memory controllers 28 and 30 and extended memory 36 to control the particular type of storage operations to be provided.

DCW register decoder 46 adds six bits to the address field to derive an address for applying to memory select control 38. Decoder 46 applies by means of address bus 76 a 24 bit address to memory select control 38. Memory select control 38 decodes the address to provide for selectively coupling both memory controllers 28 and 30 through interconnecting cables 70 and 72 and ports A and B to extended memory controller 18. Memory select control 38 selectively couples cables 70 and 72 to the N bus 74 and P bus 75 respectively for providing for the transfer of information from memory controller A and memory controller B to extended memory controller 18. Memory select control 38 also responds to the address to provide for coupling cables 70 and 72 to U and V busses. Memory select control 38 also responds to the address to simultaneously couple memory controllers 28 and 30 to control bus 85 for simultaneously applying an interrupt signal to both memory controllers 28 and 30 requesting access to a location specified by the address provided by address bus 76. Memory select control 38 also provides for automatically supplying separate addresses to memory controllers 28 and 30 by supplying a binary 1 signal to address line A22 to the address provided on lines of address bus 76 to derive an address effectively representing the address on bus 76 plus a numerical value of 2 for applying to one memory controller while the other memory controller receives the address on bus 76 in unmodified form.

The particular type of operation is determined by one of the three function signals which are presented at the output of decoder 46, namely RDY or WRY, corresponding to the previously described read and write operations respectively. These signals are provided in accordance with the binary configuration of the states of five flip-flops of a register designated as the F register in decoder 42.

DCW register decoder 46 decodes the function portion of the DCW to provide control signals for controlling both of memories 20 and 22 and extended memory 36 to effect a specified information transfer between memories. Control signals from decoder 46 are applied to main memory control 44, extended memory 36, and data transfer control matrix 156. Main memory control 44 responds to a RDY or WRY function signal providing the command code and other command code signals to be described hereinafter to memory controller 30 on control bus 85. Control signals are also applied to decoder 46 to control deriving the addresses of information to be transferred to address bus 76 and subsequently through memory select control 38 and cables 72 and 70 to memory controllers 28 and 30. The control signals supplied to extended memory 36 comprise an extended memory address which is compared with addresses supplied from a source with an extended memory 36 until comparison is achieved indicating that the addressed location is available for access.

While address comparison is being performed, main memory control 44 has provided signals which in the case of a write operation have provided for the retrieval and transfer of four 36 bit words from two successive locations of memory 20 and two successive locations of memory 22 into buffer registers 174. Buffer registers 174 are comprised of four 36 bit registers hereinafter referred to as a first, second, third, and fourth buffer register. Since the N and P busses 74 and 75 respectively provide only 36 lines for transfer of one 36 bit word at a time, four sets of 36 gates within data input gates 40 are enabled selectively by four signals from data transfer control matrix 156 to enter 36 bits successively into the four 36 bit registers. In the case of a read operation no main memory information transfer is performed until after address comparison. For a write operation upon achieving address comparison by extended memory 36 the buffer registers 174 contents are transferred in parallel for storage in extended memory 36.

During a read operation main memory control 44 provides for applying four 36 bit words which have been read from extended memory 36 and temporarily stored in buffer registers 174 along with command address and timing signals to provide for storage operation of two words in each of memories 20 and 22 during a predetermined interval of time. During each predetermined interval of time while performing a write operation, two new 36 bit words are retrieved from each of memories 20 and 22, transferred into buffer registers 174 and then transferred in parallel to extended memory 36 before the next interval of time during a write operation.

Main memory control 44 provides a control signal to DCW register decoder 44 for automatically incrementing the addresses applied to memory controllers 28 and 30 such that words are stored in or retrieved from a block of 64 main memory locations whose addresses are consecutive. During a read operation extended memory 36 provides a full signal to main memory control 44 indicating that buffer registers 174 have received four words read from extended memory 36. Main memory control 44 responds to the full signal to provide for applying an interrupt signal representing an access request through memory select control 38 to memory controllers 28 and 30 along with command address and timing signals to provide for a next storage operation of two words in each of memories 20 and 22 following the receipt of each full signal from extended memory 36. Following the reading and entering of each four 36 bit word from extended memory 36 into buffer registers 174, extended memory 36 applies a full signal to main memory control 44, main memory control 44 provides for automatically incrementing the address contained in a DCW register decoder 46 by four following the transfer of each four words to memory controllers 28 and 30 such that words are stored in or retrieved from a block of 64 main memory locations whose addresses are consecutive.

The control or a read or write operation continues until an end of operation signal is received by extended memory controller 18 from extended memory 36. When the end of operation signal is received, main memory control 44 terminates the read or write operations.

Memory select control 38 receives a 24 bit address from PCW register decoder 46 preceding the transfer of two words to each of memory controllers 28 and 30 or the retrieval of each two words from memory controllers 28 and 30. The addresses are automatically incremented following the transfer of each four words by DCW register decoder 46 and directed to a respective memory controller 28 or 30 by memory select control 38. Memory select control 38 as previously described automatically increments by the address supplied by address bus 76 two through applying a binary 1 address bit A22 to derive a second address from the address supplied by address bus 76 by increasing the address by a numerical value of two. Memory select control 38 also responds to the address on address bus 76 to select the one of memory controllers 38 or 30 for receiving the increased address, depending upon the original address applied from DCW register decoder 46 to memory select control 38. Since the addresses are interleaved, with the address for locations 0–1 applied to memory controller A and the address for locations 2–3 applied to memory controller B. The consecutive addresses are alternately assigned in parallel to memory controllers A and B thereby providing for utilizing only one half the memory locations of memories 20 and 22 during the access to locations 0–32,767. Selection control within memory select control 38, which is to be described in detail hereinafter provides for assigning the addresses beginning with 32,768 by alternately assigning the addresses to memory controllers 28 and 30 beginning with memory controller B selected for receiving the address representing location 32,768 and alternating the assignment of consecutive addresses to memory controllers B to A starting with memory controller B. The addresses are thereby interleaved by alternating from memory controllers A to B, for addresses from 0–32,767 and interleaved by alternating from B to A for addresses from 32,768–65,535. The size of memory in the illustrated embodiments of FIGS. 1 and 4 is indicated as 32K; however, any desired side memory up to eight million may be utilized in a system configuration of 4 memories assuming that 24 bits are available for addressing locations in the memory, since the maximum decimal number expressed by 24 bits is 33,474,432. If the first memory location is numbered 0 then only 32,768 locations may be specified by 15 address bits. If the address is 24 bits as indicated by address bus 76, a maximum address of 33,474,432 word locations is possible. In the data processing system illustrated in FIG. 4 and to be described in greater detail hereinafter, memories A and B have a combined total capacity of 65,535. A detailed description will now be given of the structure of major components and signals as shown in FIGS. 5 through 10.

The following conventions in terminology and notation are to be followed in the drawings and following description. It will be noted in the drawings that there are wide connecting lines and narrow connecting lines. A wide connecting line indicates a number of conductors or cable of conductors, whereas a narrow connecting line indicates a single conductor.

Extended memory controller logic blocks are made up of conventional storage and shift registers, counters, flip-flops, OR-gates, exclusive OR-gates, AND-gates, inverters, comparators, pulse distributors, decoders, encoders and control matrices which are well-known in the art and which operate in a normal manner. Extended memory controller logic blocks will be described in detail hereinafter.

The term "control matrix" as used in the following description comprises a set of gates provided to route logic level signals hereinafter referred to as binary 1 signals or binary 0 signals throughout the extended memory controller. For example, the control matrix consists of OR and AND-gates, certain of which will be enabled when a given output signal from a decoder is present as an input together with a timing signal to provide outputs for sequencing operations. The control matrix must therefore control the distribution of signals in a time sequence to correct points throughout the machine in response to the receiving of certain time related signals and certain decoded control signals.

In the description hereinafter the term "read" is used to specify an operation of retrieving information from extended memory 36 and transferring the information to both of memories 20 and 22 for storage. The term "write" is used to specify an operation for retrieving information from both of memories 20 and 22 and transferring the information to extended memory 36 for storage.

Memory controllers 28 and 30 may be of a type disclosed in copending patent application by David L. Bahrs et al. entitled "Intercommunicating Multiple Data Processing System" assigned to the General Electric Company and bearing the Ser. No. 555,491 and filed on June 6, 1966.

Memory controllers 29 and 31 with associated memories 21 and 23 as shown in FIG. 1 are identical in construction and operation to memory controllers 28 and 30 which are to be described with reference to FIG. 4. FIG. 4 illustrates the signal conductors which couple together the major components of memory controllers 28 and 30 and extended memory controller 18. Operation of memory controllers 28 and 30 is disclosed in the referenced Bahrs et al. copending patent application. Memory controller 30 in the following description provides access to memory 22 and memory controller 28 provides access to memory 20 by extended memory controler 18.

Memory 20 will be described with reference to FIG. 5. Memories 20–23 may be identical. Memory 20 comprises a memory storage unit 52, a buffer register for temporarily holding words retrieved from and to be stored in memory storage elements and denoted as input/output register 54, a register for identifying storage locations and denoted as address register 56, read-write control circuits 58 and gates (not shown) as required. Memory storage unit 52 is adapted to store a plurality of operand words, instruction words and control words in a corresponding plurality of memory storage locations, each such location storing one word. Each memory storage location is designated by an address.

One form of memory storage unit suitable for employment with memory 22 is a coincident current memory core type of random address memory well-known in the art. Memory 22 is of the well-known double precision type wherein two words and two locations with consecutive addresses are addressed simultaneously with one even numbered address and the two words transferred to memory controller 30 successively one word at a time during a double precision memory cycle time. For example, the address of an even numbered location will automatically address the even numbered location and the next higher numbered odd location such as locations 100 and 101. During a double precision memory cycle time two words may be stored or retrieved in any two memory locations with consecutive numbered addresses, where the first location has an even numbered address.

Storage unit 52 may have various capacities for storage. One storage unit which may, for example, be employed with the instant invention has a capacity for storing approximately 32 thousand data words, each word comprised of 36 binary digits. Each binary digit of a word is stored in a corresponding magnetic core. The location of a particular word is identified in a number stored in address register 56 and a particular word is retrieved from or entered into memory storage unit 52 at the location identified by the contents of address register 56. Memory storage unit 52 stores information words including instruction words, operand words and data control words.

Input/output register 54 receives words from memory controller 30 which are intended for storage in the storage unit. Words are entered into the input/outptu register 54 from either storage unit 52 or from the memory controller. Words retrieved from storage unit 52 are applied to memory controller 30 and also applied to storage unit 52 for restoration. An address is entered into the address register from memory controller 30. Read/write control circuits 58 provide output signals to control the retrieval of data words from and storage of data words into storage unit 52. The required signals for controlling the storage unit 52, input/output register 54, address register 56, and read/write control circuits 58 originate from memory controller 30.

Figure 5:
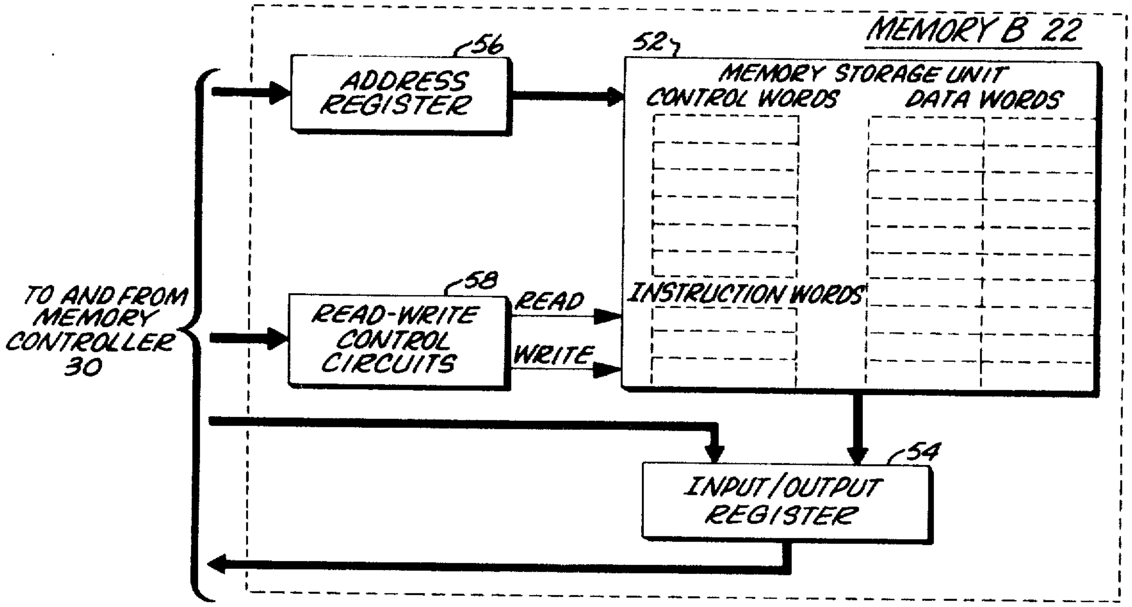
FIG. 5 is a block diagram of a memory of FIG. 4 and includes a storage map illustrating a group of locations storing control words and a group of locations storing data words.

FIG. 5 represents a memory map or storage unit for memory storage unit 52 illustrating the location of instruction, control and operand words stored in groups of locations whose addresses are consecutive. In the illustrated embodiment of FIG. 4, words are transferred from extended memory 36 in blocks of 64 words to be stored in 64 main memory locations whose addresses are consecutive with the addresses being interleaved between memories A and B. Words transferred in the opposite direction are retrieved from 64 main memory locations whose addresses are consecutive for transfer to extended memory 36.

Control of memory controllers 28 and 30 and extended memory 36 by extended memory controller 18 requires certain distinct communication signals. The cables providing communication and data transfer paths between extended memory controller 18 and memory controllers 28–30 are illustrated in FIGS. 1 and 4 by interconnecting lines 70 and 72 respectively. Interconnecting lines 70 and 72 each symbolically represent cables.

Figure 7:
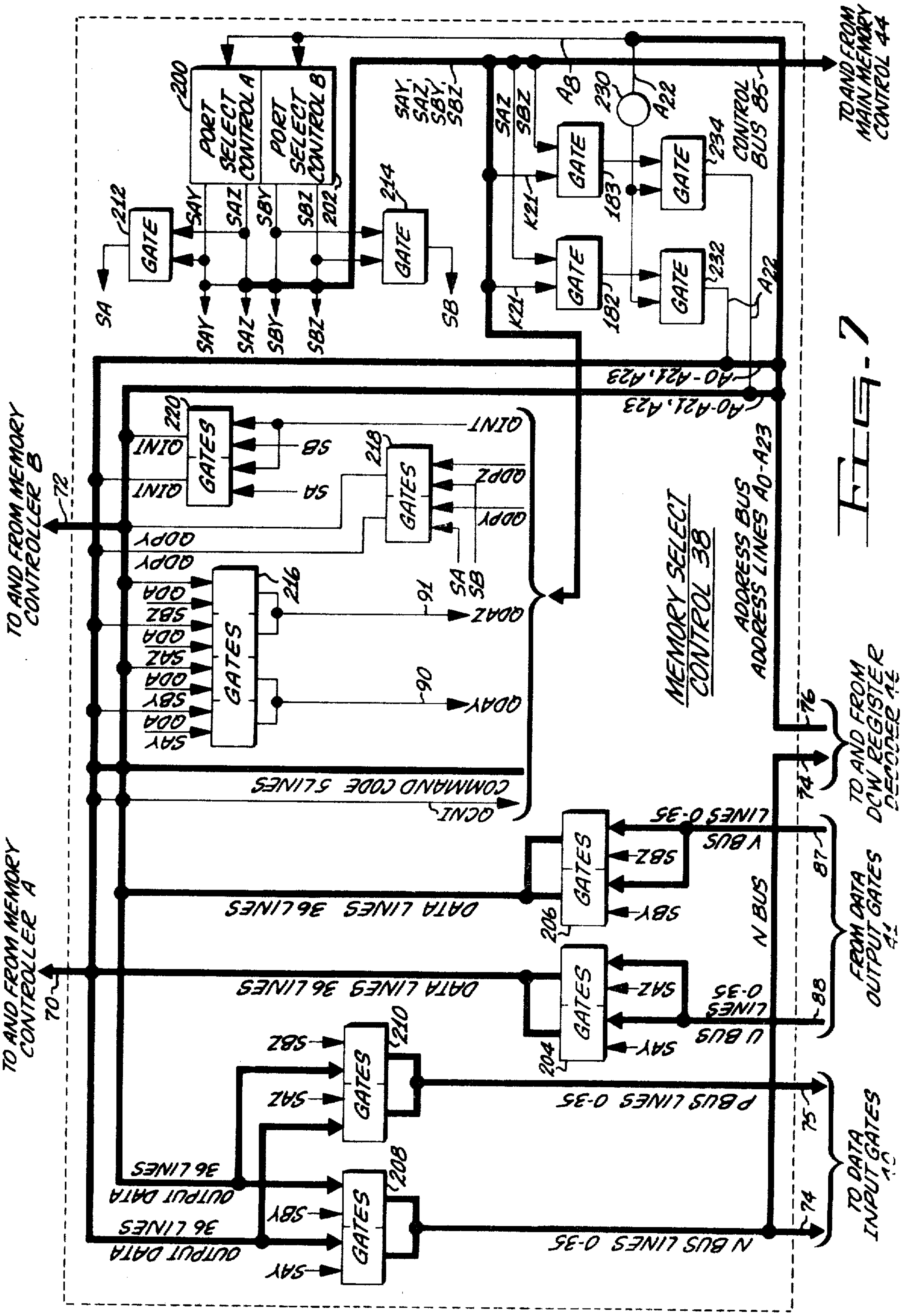
FIG. 7 is a block diagram of the memory select control of FIG. 4.

Communication between a memory port of extended memory controller 18 and the memory controller connected to that port is effected by a group of lines carrying predetermined signals, this group of signals comprising input signals transmitted from the memory controller to the port of controller 18 and output signals transmitted from the port of controller 18 and the memory controller connected to the port is the same for each memory controller—memory port connection. FIG. 7 illustrates the group of lines interconnecting a memory port of extended memory controller 18 with a memory controller and the signals on these lines. The illustrated ports are designated by alphanumeric characters A, B, C or D corresponding to one of the memory ports of extended memory controller 18.

Information address and control signals which are transmitted between the memory controllers 28 and 30 and extended memory controller 18 through ports A and B are designated in FIGS. 4, 6, 7 and 9. In the illustrated embodiment the conductors providing communication paths between extended memory controller 18 and memory controllers 28 and 30 are all contained within N bus 74, P bus 75, U bus 88, V bus 87, address bus 76 and control bus 85, FIG. 4. All information is transferred as 36 bit words on 36 data lines of U bus 88, 36 data lines of P bus 75, 36 data lines of U bus 88 and 36 data lines of V bus 87 as shown. The N and P buses communicate selectively through data input gates 40 and the U and B buses communicate selectively through data output gates 41 with buffer registers 174 and other logic blocks of extended memory controller 18. The U and B buses provide data for transfer to memory controllers 28 and 30 from the buffer registers 174. The N and P buses receive output data signals from memory controllers 28 and 30 and provide the output signals selectively into buffer registers 174 and from the N bus directly into registers of DCW register decoder 46.

Figure 6:
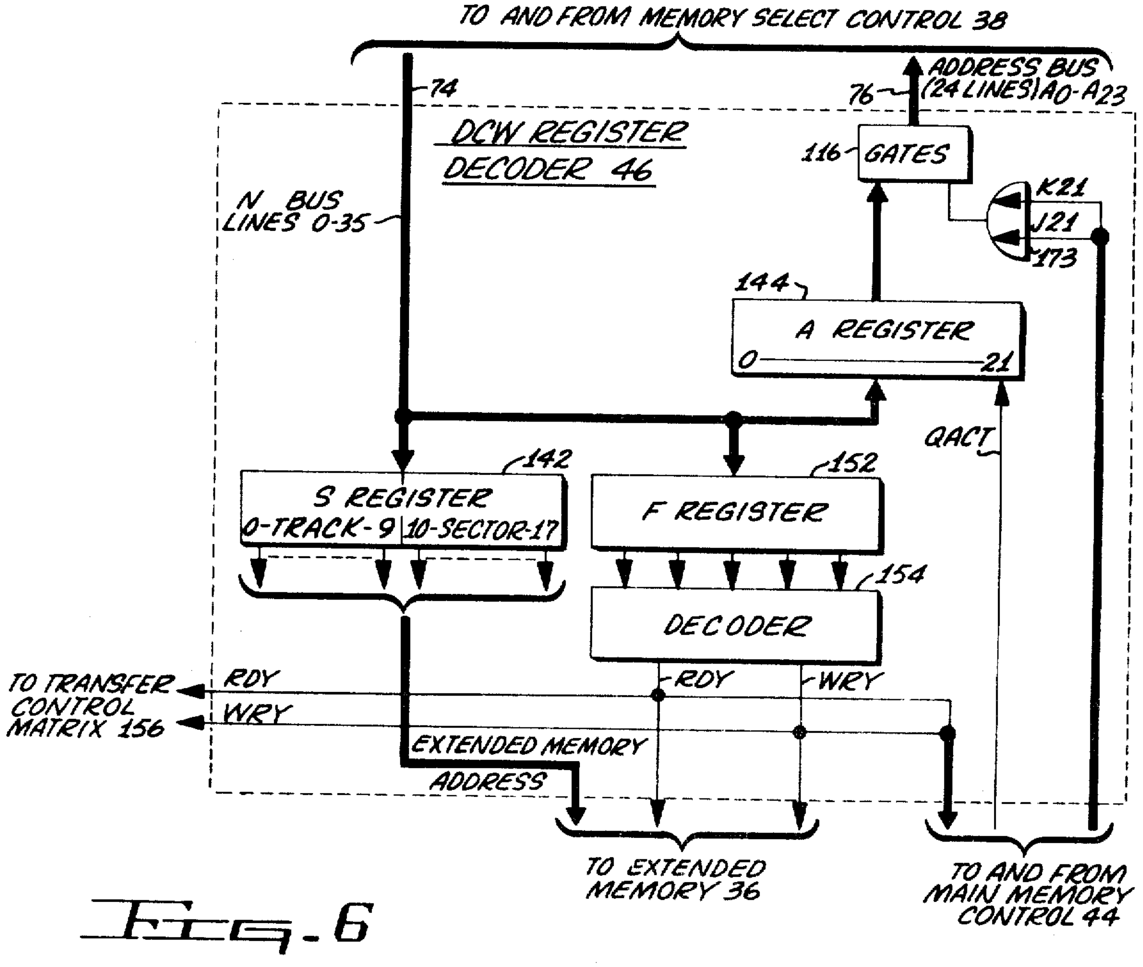
FIG. 6 is a block diagram of the DCW register decoder of FIG. 3.
Figure 9:
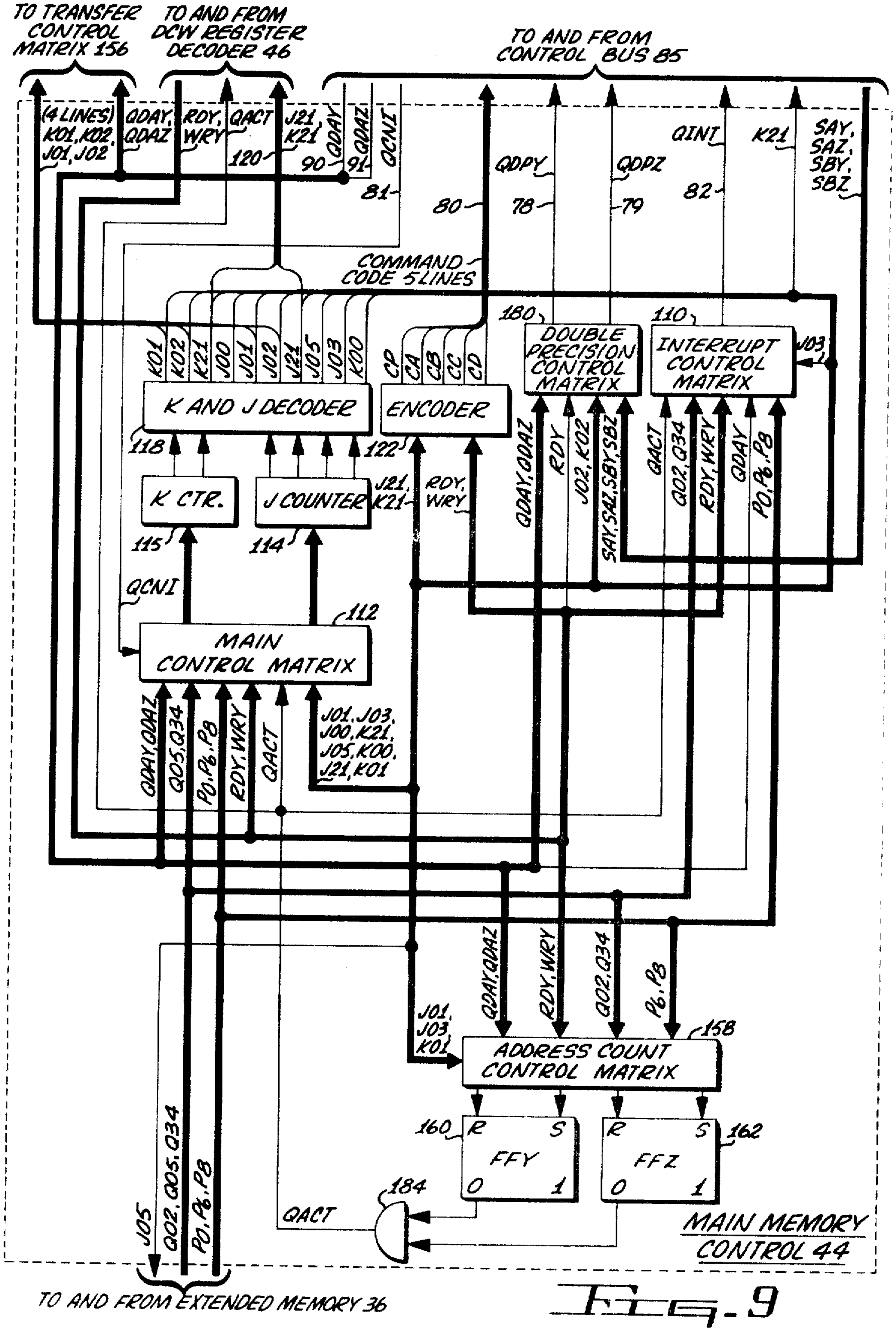
FIG. 9 is a block diagram of the main memory control of FIG. 4.

The N and P buses are each connected to data input gates 40 and the U and B buses are each connected to data output gates 41. Gates 40 are comprised of a plurality of gates for selectively controlling the transfer of 36 bit words, one word at a time out of different ones of four 36 bit holding registers 174. Data input gates 40 transfer one word therethrough in response to each of the four designated signals on lines 186, while data output gates 41 respond to each of the four designated signals on lines 179. FIGS. 6 and 9 illustrate in detail the logic blocks of DCW register decoder 46 and main memory control 44. In these figures the control signals which are transmitted and received through control bus 85 are identified. The N bus lines are also selectively connected to the A, F and S registers of DCW register decoder 46 to enter portions of a DCW received from main memory into appropriate registers of DCW register decoder 46.

Control bus 85 provides for receiving and transmitting all control signals other than address and information signals between memory select control 38 and main memory control 44. Control signals transmitted through memory select control 38 to memory controllers 28 and 30, comprise 24 address signals applied to address bus 86, a five bit binary coded command designated as command code on a cable identified by reference numeral 80, a QDPY pulse on line 78, a QDPZ pulse on line 79 and a QINT pulse on line 82. Control signals received from memory controllers 28 and 30 by extended memory controller 18 and transferred by memory select control 38 through control bus 85 to main memory control 44 are a QDAY pulse on line 90 and a QDAZ pulse on line 91. The control signals identified in the preceding description correspond to the signals designated as address lines ADDR (18 bits/chan.), CMD code lines and prot. line (5 bits/channel.), DBL. PREC./rewrite line (I$DP/Chan.), Chan. Int./$I, and $DA, in the referenced Bahrs et al. copending patent application.

The addresses applied to each of memory controllers 28 and 30 comprise 24 bits. The first bit of the address is termed the most significant bit and the last bit is termed the least significant bit of the address. The bits between the most and least significant bits are accorded successively decreasing orders of significance. The entire address represents the numerical value provided by 24 bits. The first bit of the address line is delivered on line A0 as illustrated in FIG. 5 as the most significant bit and the twenty-fourth bit delivered on line A23 is the least significant bit. The remaining bits are accorded successively decreasing orders of numerical significance, depending upon their respective positions between the most and least significant bits. The twenty-fourth bit of the binary numeric address represents $2^0$, the decimal number 1, when the twenty-fourth bit is a binary 1. The twenty-third bit represents $2^1$, the decimal number 2 when the twenty-third bit is a binary 1. The twenty-second bit represents $2^2$, the decimal number 4, when the twenty-second bit is a binary 1. Address lines of address bus 76 provide 24 address signals; however, only the signals representing the 18 least significant addresses are accepted by the memory controller of the illustrated embodiment. Addressing as described hereinafter will be presented utilizing a 24 bit address.

Addresses from DCW register decoder 46 are selectively transferred through gates 116 to memory select control 38 in response to signals on lines 120 from main memory control 44. Gate 182 and gate 183, FIG. 7, also receive input signals on lines of control bus 85 to provide a binary 1 signal on address line A22 during main memory information transfer operations. This has the effect of incrementing the memory address, applied to the memory controller selected to control the retrieval or storage of the Z pair of data words by a numerical value of two during every four word transfer operation within main memory.

Figure 10:
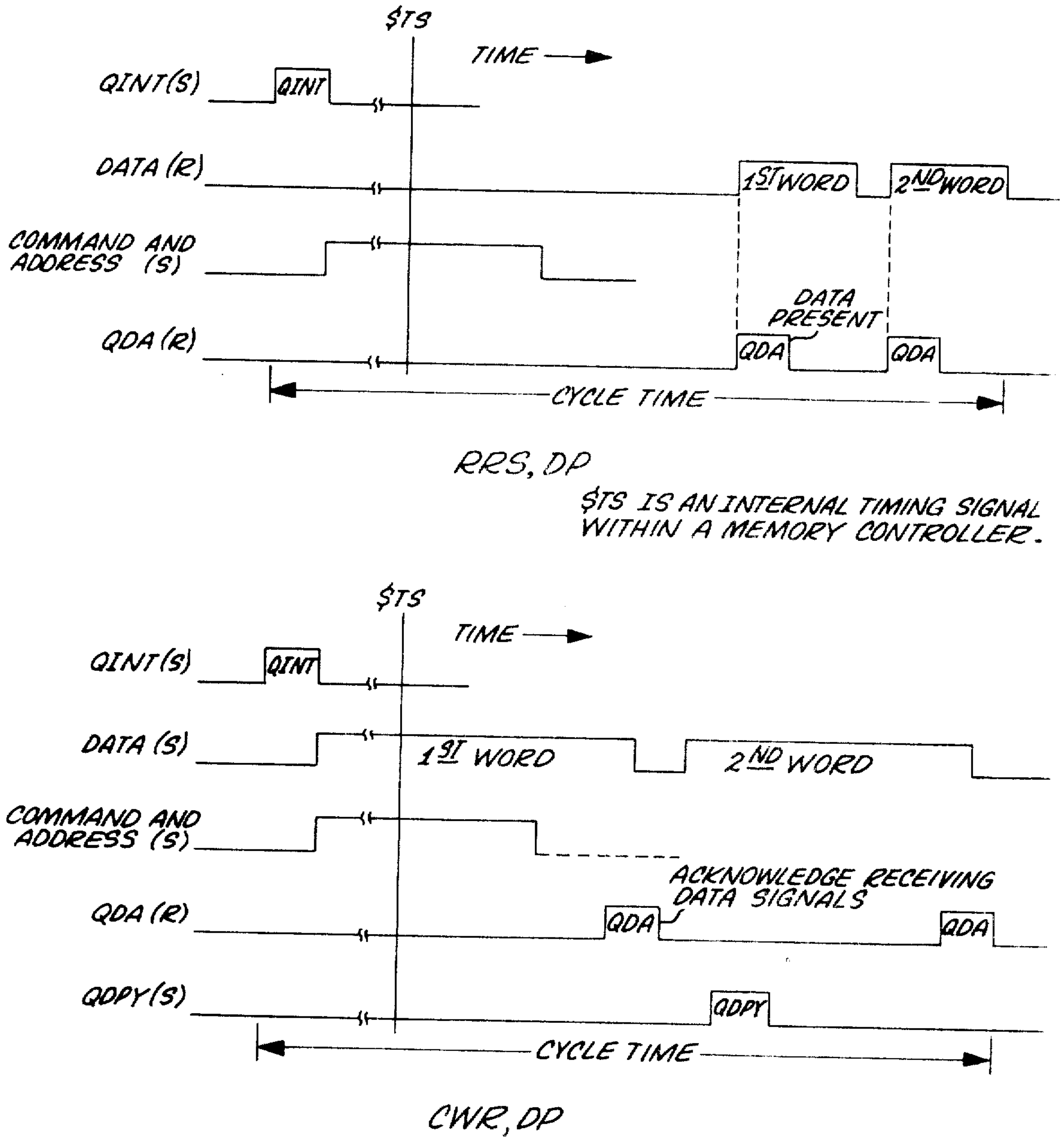
FIG. 10 illustrates waveforms of control signals transmitted between a memory controller and an extended memory controller.

Control bus 85 provides one remaining control signal not described in the preceding description or illustrated in the waveforms of FIG. 10. As shown in FIG. 7, a signal designated QCN1 is provided on line 81 of control bus 85. The QCN1 signal is supplied by memory controller 28 or 30 during operating system initialization of extended memory controller 18 to perform a desired operation as described hereinafter.

In the waveforms illustrated in FIG. 10 the information, address, and control signals that the memory controller receives from extended memory controller 18 during main memory access cycles are identified. The information and control signals that the memory controller transmits to the extended memory controller 18 during main memory access cycles are also identified. In the system of the instant invention, controller 18 is capable of issuing main memory cycle commands to the memory controller. Two of the main memory cycle commands are to be described in detail hereinafter. The commands are represented by five signals representing a five bit binary code. Signals representing the five bit binary code are transmitted by means of lines 80 to memory controllers 28 and 30. These commands are designated as RRS, DP and CWR, DP in FIG. 1 and hereinafter in the structural and operational descriptions of main memory control 44. FIGS. 4, 6, 7, 8, 9 and 10 will be referred to in the following descriptions of communications between a memory controller and an extended memory controller for controlling the access to memories 20 and 22.

Following receiving a DCW through memory select control 38 from one of memory controllers 28 or 30 in response to a computer executing a connect instruction, the function code of a DCW is transferred to R register 152 of DCW register decoder 46 to determine a type of control cycle to be entered. In the control cycle extended memory controller 18 controls the type of storage operation to be performed by each of memories 20 and 22 and extend de memory 36 under the control of function signals provided by R register decoder 154. The particular type storage operation to be provided by memories 20 and 22 and extended memory 36 is determined by one of two signals which is present at the output of decoder 154; namely, RDY or WRY.

Main memory control 44, FIG. 9, comprises a four stage J counter 114 comprising four flip-flops to provide control signals during all transactions with memories 20 and 22. The J counter in its defined states of J02, J01, or J00 is used to provide control signals during a two word transfer to and from the one of memories 20 and 22 which is selected to receive a Y pair of words. The J counter states of J03 and J05 are used to provide signals for a housekeeping operation and a retrieval of DCW operation by one of memories 20 or 22. K counter 115 is a two-stage counter comprising two flip-flops to provide control signals during a two word transfer to the one of memories 20 and 22 which is selected to receive a Z pair of words. For example, the K counter in its defined state K00, K01 and K02 provides control signals for controlling the transfer of two words from or to memory 22 when memory B is selected to retrieve or store the Z pair of words while the J counter in its defined states of J02. J01 or 100 is used to provide control signals for controlling the transfer of two words from or to memory 20 when memory A is selected to retrieve or store the Y pair of word signals during a four word transfer from or to memories 20 and 22.

Main control matrix 112 receives the RDY and WRY signals from R register 152, in conjunction with other signals to be described in detail hereinafter to control the K and J counters during or following four word memory transfers. K and J decoder 118 decodes the output signals from flip-flops of the K and J counters to provide K01, K02, K00 and K21, J00, J01, J02, J21, J03 and J05 timing signals for distribution to logic blocks throughout extended memory controller 18. The K21 and J21 signals designate that the K and J counters are in the K01 or K02 and J01 or J02 states respectively.

Address count control matrix 158 in conjunction with flip-flops FFY, FFZ and gate 184 provides for incrementing the address represented by the contents of A register 144 by a count of four following each four word transfer of information involving memories 20 and 22.

Control for retrieving a DCW from one of memories 20 or 22, an understanding of which is not material to an understanding of this invention is provided during a J counter state of J05. Extended memory controller 18 may retrieve a DCW, in a manner for example, as disclosed in copending application by John F. Couleur et al. entitled "Data Storage Control Apparatus for a Multiprogrammed Data Processing System"; assigned to the same assignee as this patent application, and bearing the U.S. Patent No. 3,525,080 and filed on Feb. 27, 1968. Control of a housekeeping operation; an understanding of which is not material for an understanding of this invention is provided during a counter state of J03.

A DCW is received from memory select control 38 by means of N bus 74 and portions are entered into the A, F, and S registers, FIG. 6. Signals representing the extended memory address and data address are transferred into the S an A registers respectively of ecoder 46. Signals representing the data address are transferred into the A register for storage in flip-flops representing the 18 most significant address bits while the A register flip-flops representing less significant address bits A18 and A21 are reset to their binary 0 state. The function code of DCW2 is transferred into the F register.

Encoder 122 responds to J21, K21, RDY and WRY signals to apply a five bit binary coded command, by means of lines of cable 80 to memory select control 38. Outputs from encoder 122 designated as CP, CA, CB, CC and CD, FIG. 9, are applied to lines of cable 80 for transmittal to memory select control 38. The commands generated in extended memory controller 18 which are described in the following descriptions, are the read-restore double precision hereinafter designated as RRS, DP and clear-write, double precision hereinafter designated as CWR, DP. With five command code lines available it is possible to generate as many as 32 different five bit combinations to represent command. The binary coded output signals RRS, DP and CWR, DP are as follows:

| | Output Line | | | | |
|---|---|---|---|---|---|
| | CP | CA | CB | CC | CD |
| Command: | | | | | |
| RRS, DP | 1 | 0 | 0 | 0 | 1 |
| CWR, DP | 1 | 0 | 1 | 0 | 1 |

Extended memory controller and memory controller exchange control and information signals through memory select control 38 with the control and information signals as illustrated by the main memory timing signal waveforms of FIG. 10 for the RRS,DP and CWR,DP commands.

Double precision control matrix 180 and interrupt control matrix 110, FIG. 9, provide output signals QDPY on line 78, QDPZ on line 79, and QINT on line 82 respectively in a timed relationship to the QDAZ, QDAY, QPIN signals received on line 91, 90 and 84 respectively from memory select control 38. The QDAY signal indicates that data signals from the memory 20 or 22 selected to retrieve the Y pair of data words, can be entered into the extended memory controller or that the data signals from the extended memory controller have been received by the one of memory controllers 28 or 30 selected to control the storage of the Y pair of data words. The QDAZ signal indicates that sigals from the memory 20 or 22, selected to retrieve the Z pair of data words, can be entered into the extended memory controller or that data signals from the extended memory controller have been received by the one of memory controllers 28 or 30 selected to control the storage of the Z pair of data words. The extended memory controller interrupts memory controllers 28 and 30 and requests an operation by means of simultaneously transmitting the QINT to memory controllers 28 and 30. The QINT signal is generated by enabling interrupt control matrix 110. The QDPY signal is used during a CWR,DP function to indicate to the memory controller selected to receive the Y pair of data words that the second 36 bit data word is now present on V bus 87. Further explanation of the timing signals will be given in the detailed operation description hereinafter utilizing RRS, DP and CW,DP commands.

One 36 bit word at a time is applied to memory select control 38 over 36 data lines designated as N bus 74 and one 36 bit word at a time over 36 data lines designated as P bus 75. The 72 data lines of the combined U bus 88 and V bus 87 present two 36 bit data words to memory select control 38 for storage of one word in each of memories 20 and 22. Twenty-four address bits are applied to twenty-four address lines of address bus 76, a double precision rewrite signal over one line 78 designated as QDPZ and five command code signals over lines within cables 70 and 72 to provide control communication enabling memory controllers 28 and 30 to control a retrieval or storage operation by addressed memories 20 and 22. As a result, extended memory controller 18 transmits or receives one 36 bit data word at a time to or from each of memories 20 and 22 by means of cables 70 and 72 respectively. The address signals of lines within address bus 76 which are applied to one memory and the address signals plus A22 as a binary 1 applied to second memories include a 24 bit address which selects a 72 bit word contained in two locations with consecutive addresses in each of memories 20 and 22. The least significant address bit of each set of address signals is utilized to retrieve or store either the upper or lower half to the 72 bit word that is stored or retrieved in memories 20 or 22. Each memory controller is associated with a separate memory. As previously described the memory controllers 28 and 30 in the illustrated embodiment utilize an 18 bit address thereby rendering it possible for a single memory controller to provide addresses for controlling access to 256K locations or alternately for a group of memory controllers to collectively access a total of 256K locations.

Memory select control 38, FIG. 7, derives two separate addresses from the address supplied by lines $A_0$–$A_{23}$ of address bus 76. The binary 0 signal present on line $A_{22}$ is inverted through inverter 230 and applied as a binary 1 input to each of gates 232 and 234 which receive signals from gates 182 and 183. Accordingly, one of gates 232 and 234 is enabled by the output of gates 182 and 183 to provide for applying a binary 1 signal on line $A_{22}$ of either cable 70 or 72 respectively while the other one of gates 232 and 234 is not enabled to provide a binary 1 signal on line $A_{22}$ of either cable 70 or 72. Thus separate addresses are derived by memory select control 38 in a manner to be described in detail hereinafter.

Memory select control 38 automatically selects the two memory controllers for receiving separate addresses. Memory select control 38, FIG. 7, provides for selecting ports A and B by means of port select control 200 and port select control 202. Controls 200 and 202 provide for selecting two memory controllers which are to be controlled by extended memory controller 16. Memory select control 38 contains as many port select controls as there are ports, for example, in the illustrated embodiment of FIG. 1 control 38 would contain four port select control units. Port select control 200 and port select control 202 provide for selecting one memory controller to control the retrieval or storage of a Y pair of data words and a second memory controller to control the retrieval or storage of a Z pair of data words. The control signals and data lines are selectively coupled to two different memory controllers by memory select control 38. Memory select control 38 receives the address bus lines A0 through A23 and responds to provide for selective information bus control and control signal gating for simultaneously transferring control and data signals between extended memory controller 18 and memory controllers 28 and 30. Port select controls 200 and 202 receive a signal provided by address line A8 from DCW register decoder 46 and respond to the A8 binary bit to select either the memory controller 28 or 30 as the controller for controlling the retrieval or storage of the Y or Z pair of data words and for selecting which controller to receive the address which has been increased by a numerical value of two. The Y selected memory receives a first address which is the address field of a DCW with 6 additional 0 bits. The Z select memory will receive a second address which is effectively the address field plus 6 bits increasing the first address by a numerical value of two. Memory select control 38 also receives data input signals from U bus lines 0–35 and V bus lines 0–35 for applying signals by means of gates 204 and 206 to cables 70 and 72 interconnecting memory select control 38 through ports A and B to memory controllers A and B respectively. In each case of the illustrated embodiment of FIG. 4 the A and B memories will always be selected, one being selected to retrieve or store, the Y pair and the other being selected to retrieve or store the Z pair. Therefore port select control 200 and 202 provides signals for enabling gates 208 and 210 to selectively transfer signals from memory controllers A and B to the N and P buses respectively.

SA, SB, SAY, SBY and SBZ signals provided by port select controls 200 and 202 are applied to gates 216, 218 and 220 for selectively transferring control signals from control bus 85 between memory controllers 28 and 30 and extended memory controller 18. N bus 74 is connected directly from memory select control 38 to DCW register decoder 46 for entering each DCW into DCW register decoder 46. Gates 204, 206, 208 and 210 of memory select control 38 are each comprised of two separate sets of 36 gates for controlling the transfer of signals from output data lines of memory controllers 28 and 30 to the N and P buses and to transfer 36 signals from the U and V buses to data lines for applying to memory controllers 28 and 30. Gates 216, 218, and 220 are comprised of individual gates each controllable by specific ones of the SA, SB, SAY, SBY, SAZ and SBZ signals from port select controls 200 and 202.

Figure 8:
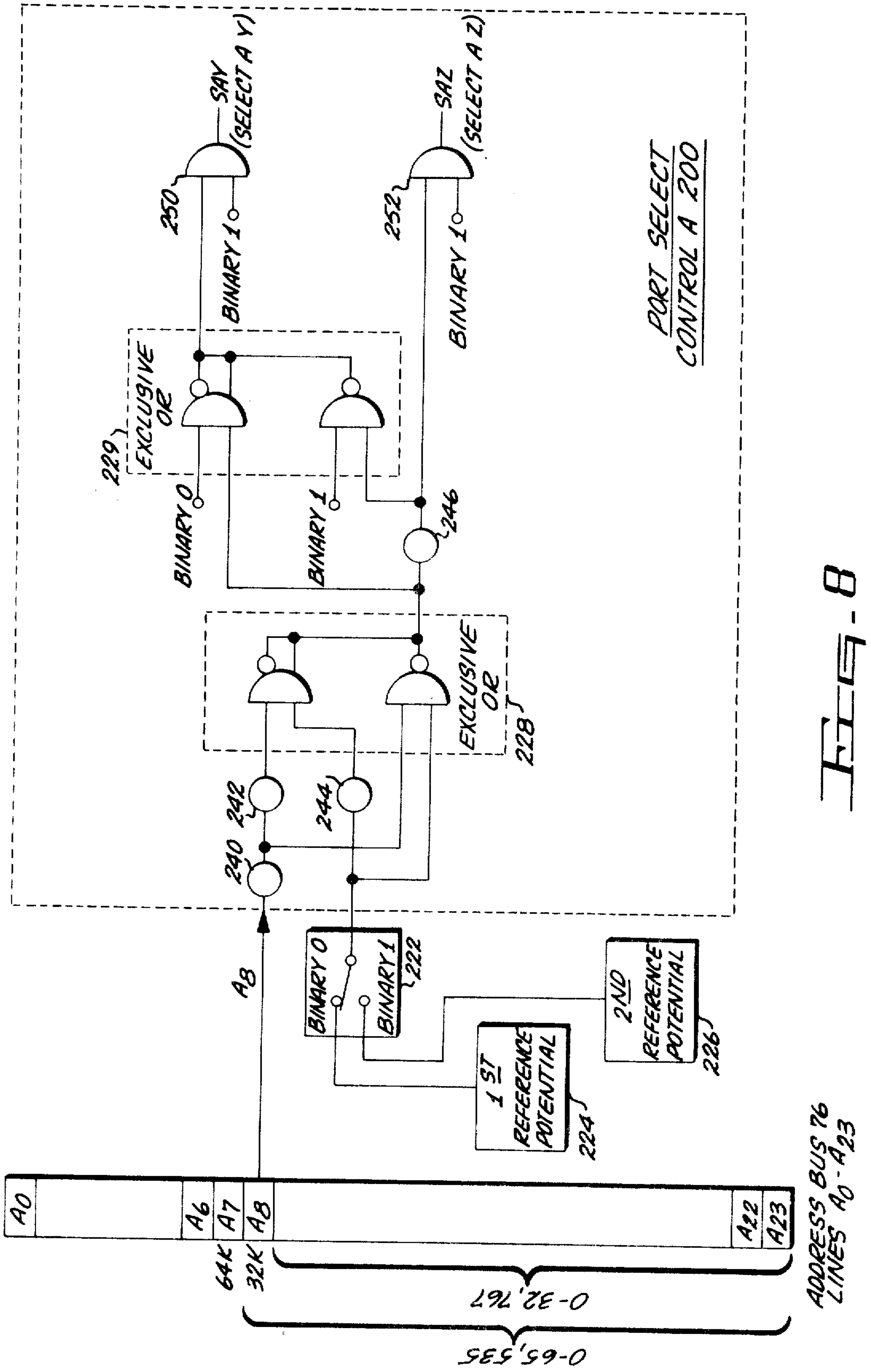
FIG. 8 is a logic schematic of the port select A logic block of FIG. 7 and a representation of an address employed in the system of FIG. 4.

Port select controls 200 and 202 are identical in structure and provide for selection of memories A and B according to the size of memories connected to each memory controller. For example, the address representation of FIG. 8, illustrates that address bits A8 through A23 provide the least significant bits of an address being applied to memory controllers 28 and 30 each coupled to a memory having a capacity of 32K locations. Address bits A9 through A23 provide addresses for locations numbered 0 through 32,767 and memory address bits A8 through A23 provide addressing capability for up to 65,535 word locations of memories A and B combined. Since the memories 20 and 22 of the illustrated embodiment of FIGS. 1 and 4 have a capacity of 32K each, address bit A8 is utilized to determine the selection of memory A or memory B as a Y or Z memory for accessing. The Y or Z selection signifying the memory which is selected for receiving the lower numbered address and the Z selected memory for receiving the higher numbered address supplied. Memory A is selected as the Y memory for addresses representing locations 0 to 32,767 whereas memory B is selected as the Y memory for addresses representing 32,768 through 65,535. Port select controls A and B provide for the selection of memory controllers 28 and 30 to determine which is to receive the derived addresses for memories 20 and 22.

In a two memory system as illustrated in FIGS. 1 and 4 with each memory having a capacity of 32K, the A8 address bit signifies whether an address is below or above 32,767. A configuration switch 222, FIG. 8, is used to control the selection of memories A and B as the Y or Z memory based upon comparison of a signal provided by the switch setting and bit A8. Configuration switch 222 is set to apply a binary 0 signal from a first reference potential 224 or a binary 1 signal represented by a signal from second reference potential 226 to port select control A. By way of example, if the configuration switch 222 is set in the binary 0 position, the port select control is used to control a memory representing addresses 32,767 and below, whereas with configuration switch 222 set at a binary 1 position, port select control is used to control a next 32K of memory representing addresses 32,768 to 65,535. Port select control 200 comprises exclusive OR-gates 228 and 229 for comparison of the address bit A8 with the configuration switch input signal for deriving SAY and SAZ output signals from gates 250 and 252 respectively.

Memory controllers A and B collectively access a total of 65,535 locations. In the illustrated embodiment, the A8 address bit is provided as an input to port select control 200 for comparison with the input from configuration switch 222 to determine the selection of the A memory to retrieve or store the Y and Z pair of words for applying the selected one of two separate addresses being applied to one of memory controllers 28 and 30. The A8 and configuration switch 222 inputs are applied to exclusive OR 228 to provide an output signal for inputs to exclusive OR 229 to enable exclusive OR 229 to provide an output signal to gate 250. The second inputs to gates 250 and 252 is a signal which is normally a binary 1 in this mode of operation. A binary 1 SAY output signal from gate 250 selects the A memory to retrieve or store the Y pair of data words and to receive the address with the lower numerical value derived from the address field, whereas a binary 1 SAZ output signal from gate 252 selects the A memory to retrieve or store the Z pair of data words and to receive the address with the higher numerical value derived from the address field. Port select control 200 thus provides output control signals SAY and SAZ to determine selection of memory A for receiving either the address with the lower or higher numerical value derived from the address field. Memory A may be selected to retrieve or store the Y or Z pair of data words dependent upon the applied address, in a manner to be described in detail hereinafter.

The memory controller and its associated core systems operate on a 72 bit basis and a 72 bit word is accessed in memories 20 and 22 for each memory address. 72 bits correspond to two instructions, two operand words or two control words. The memory controller receives commands from the communicating devices and once a communicating device is awarded access, the command sent by it to the memory controller is decoded and performed.

Memory select control 38 employs OR-gates 212 and 214 to derive SA and SB signals representing the selection of memories A and B respectively. These signals are not significant in the mode of operation described, however, during the addition of additional memory port select controls the output signal select SA designating select memory A and SB designating select memory B are utilized to control the application of the interrupt signals to a selected pair of memory controllers and apply the QDPY, QDPZ signals to a respective one of a selected pair of memory controllers. In the mode of operation described, even with additional ports and additional memory controllers connected, there would never be more than two memory controllers selected to receive the control signals or data being transferred at any one time. Port select control 200, FIG. 8, when used for accommodating systems comprising additional 32K memories would require additional configuration switches and comparison of the additional configuration switch inputs with additional address bits; those address bits being the bits immediately above the bit representing the maximum capacity of each of the memories.

When a DCW is retrieved from main memory, signals on N bus lines 0–35 are applied to DCW register decoder 46, FIG. 6, for entering DCW portions into specific registers.

A register 144 is comprised of 22 flip-flops for storing binary bits representative of the main memory address to be involved in an information transfer. Extended memory controller provides 24 lines designated as address bus 76. During an information transfer the 24th line, A23, corresponding to the least significant bit of the addresses, always presents a binary 0 signal, since the main memory cycle will always be double precision requiring an even numbered address. The 23rd line, A22, corresponding to the 23rd bit of the data address, has a binary 0 signal applied when presented as the address to a Y selected memory and a binary 1 signal applied when presented to a Z selected memory. At the end of a four word transfer, the A register contents are incremented by one by the QACT pulse from main memory control 44. The QACT pulse is actually applied to each flip-flop of the A register which performs as a counter to increase the A register count by one in the manner well-known in the art. Since the 22nd line, A21, corresponding to the 22nd bit of the data address receives the output signals in the A register flip-flop representing the 22nd address bit, the address portion supplied by the A register is actually increased by account of four.

S register 142 is comprised of 18 flip-flops for storing bits representative of the extended memory address of information to be involved in an information transfer. The address is applied to extended memory 36 for comparison with the address of the locations as each location becomes accessible in extended memory 36.

DCW register decoder 46 includes the F register 152 which is comprised of five flip-flops whose states are decoded by F decoder 154 to provide signals RDY and WRY, function signals to control the type of storage of both main and extended memory. Control of extended memory 36 to perform a read or write operation is provided by the RDY and WRY signals applied to extended memory 36 from decoder 154 of DCW register decoder 46.

Figure 3:
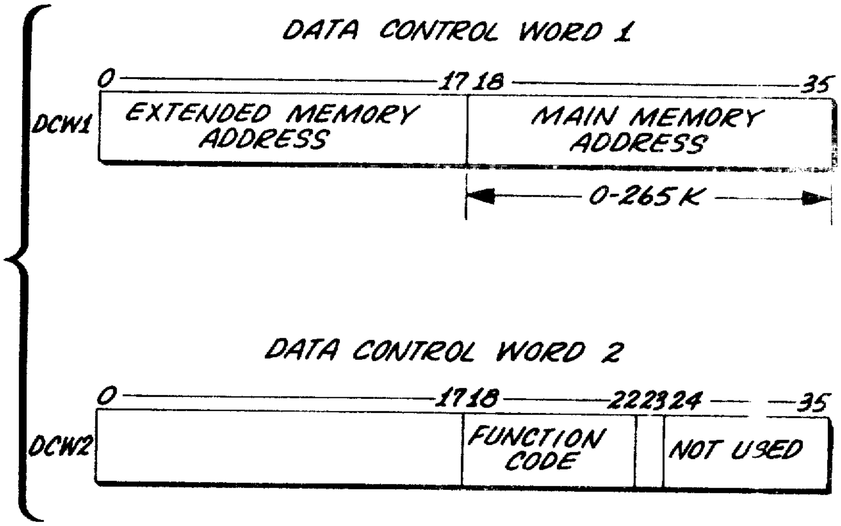
FIG. 3 is a symbolic diagram of the contents of the data control words employed in the system of FIG. 1.

Extended memory 36 may be of a type well-known in the art. Extended memory 36 is illustrated in FIG. 3 as comprising a storage unit which is, by way of example, in the form of six rotatable magnetic discs. It is understood that the memory may be in the form of a set of magnetic discs or a magnetic drum or it may assume any other known configuration or design.

Extended memory controller 18 supplies address signals to extended memory 36 from the S register of DCW register decoder 46, the RDY and WRY signals from F register decoder 154 and a signal identified as J05 from main memory control 44, FIG. 9, signifying that a read or write operation is to be initiated by extended memory 36. The J05 signal initiates operation of extended memory 36 for comparison of the address, supplied by extended memory controller 18, with the address of extended memory locations as each location becomes accessible.

Extended memory 36 provides signals to main memory control designated as Q02, Q34, Q05, $P_0$, $P_6$ and $P_8$. The Q02 signal indicates that address comparison has been achieved and that the addressed location of extended memory 36 is accessible. The Q34 signifies that a write or read operation by extended memory 36 is in process. The Q05 signal indicates that the extended memory has completed a read or write operation. The $P_0$ signal indicates that a write operation is complete. The $P_6$ signal indicates that buffer registers 174 are empty. The $P_8$ signal indicates that buffer registers 174 are full of information read from extended memory 36.

Control of a rotating type memory is well-known in the art. One manner of control may be, for example, as disclosed in the referenced Couleur et al. copending patent application.

Further details of the logic of extended memory controller 18 will be described in the following operational descriptions covering the control of the execution of data control words specifying read and write operations. Operation of extended memory controller 18 to perform an operation is initiated by a computer. Initiation of operation of extended memory controller 18 to perform an operation is provided by a computer of data processing system such as in the system illustrated in FIG. 1 by executing a connect instruction. Execution of the connect instruction results in supplying a QCN1 signal on line 81, FIG. 7 and a DCW to extended memory controller 18 from one of memories 20 or 22 in the manner disclosed in the second copending application previously referenced. The QCN1 signal is applied to main control matrix 112, FIG. 9, in conjunction with a J00 signal to provide a signal for setting the J counter to a J05 state. During a J05 state of the J Counter 114, FIG. 9, a retrieve DCW operation requiring a main memory access is performed, an understanding of which is not material for an understanding of this invention. Signals present in N bus 74 lies corresponding to DCW1 bits 0–17 are entered into S register 142 and DCW1 bits 18–35 into the 18 most significant bit positions of A register 144. In the mode of operation to be described a signal is applied to A register 144 for resetting the A register flip-flops providing signals representing the 18–21 bit of the data address. The A register now contains the address field of the DCW representing a location in one of memories 22 or 20 coupled to memory controllers 28 and 30. Following a predetermined delay, the signals of DCW2 are present on N bus 74 such that the signals representing DCW2 bits 18–22, are transferred into F register 152. The F register now contains a five bit binary code designating a particular type of operation to be controlled by the extended memory controller. F decoder 154 responds to binary configuration in F register to provide an output signal designating a read or write operation as previously described. The J05 signal is also applied to extended memory 36 to signify that an extended memory address comparison operation is to commence.

Following receiving the DCW from one of memories 20 or 22, the J05 signal in conjunction with a QDAY signal resulting from the main memory access for retrieval of a DCW is applied to main control matrix 112 to a state of J03. With J counter 114, FIG. 9, in the J03 state, a housekeeping operation requiring a main memory access is performed, an understanding of which is not necessary for an understanding of this invention. This main memory access requires communication with the memory controller 28 and provides a resulting QDAY signal on line 78 which is utilized in conjunction with the J03 signal from the K and J counter decoder 118, FIG. 9, to advance the extended memory controller 18 into a control state controlling the execution of the operation represented by the decoded output of the F register.

To illustrate the sequence of action by the extended memory controller during execution of a DCW including a function code representing a read operation, the following description is provided. If the F register contains a binary configuration of 11000, F register decoder 154 provides the DRY signal which is applied to main memory control 44, transfer control matrix 156 and extended memory 32. With the J counter, FIG. 9, a state of J03 prior to the previously described housekeeping operation, a QDAY pulse is received from memory controller 28 as a result of the housekeeping access and applied conjunctively with a J03 signal to control matrix 112 to provide an output signal for presetting J and K counters to a state of J00 and K00 respectively. The J03 signal and QDAY signal are also applied to address count control matrix 158, which in turn provides signals for switching flip-flops at FFY 160 and FFZ 162 to their binary 0 state.

The extended memory address in S register 142 is applied to extended memory 36 immediately following entry into the S register and is compared with the addresses of locations as each location becomes accessible, until address comparison is achieved. When address comparison is achieved, a Q34 signal indicating address comparison completed and a read operation has started, is transmitted by extended memory 36 to main control matrix 112 and interrupt control matrix 110. Extended memory 36 responds to the RDY signal to read information from the addressed location of extended memory 36 and supplies a $P_8$ signal to data transfer control matrix 156 when buffer registers 174 contain four 36 bit words read from extended memory 36. $P_8$, Q34 and RDY signals are applied in a similar manner to main control matrix 112 which responds to provide output signals to both the K and J counters for setting their respective states to K02 and J02. $P_8$, Q34 and RDY signals are also applied to address count control matrix 158 which responds to provide for setting flip-flops FFY and FFZ to their binary 1 states. The $P_8$, Q34 and RDY signals are also applied to interrupt control matrix 110 which applies a QINT signal to control bus 85 for application to memory select control 38.

K and J decoder 118 output signals J21 and K21 are applied in conjunction with the RDY signal from F decoder 154 to encoder 122 to provide the binary coded command signal 10101 corresponding to a CWR, DP command on lines 80 to control bus 85 for application to memory select control 38. The J21 and K21 signals are also applied by means of lines 120 to DCW decoder 46, FIG. 6, to enable OR-gate 173, thereby providing a binary 1 signal to gates 174 to provide for transferring signals from A register 144 to address bus 76 for applying to memory select control 38. Binary 0 signals are always applied from gates 144 to address lines corresponding to bits 22 and 23 of address bus 76. The J02, K02 and RDY signals are now applied to transfer control matrix 156 to generate and provide a QCOU signal on lines 179 to data output gates 41 which include a set of 36 gates responsive to the QCOU signal to transfer signals of a first buffer register 174 through U bus 88 to memory select control 38.

When four data words are present in buffer registers 174 for storage in main memory, memory select control 138 selects two memories to store the data in. The convention used in extended memory controller 18 calls for storing a pair of the words designated as the Y pair in one memory designated as the Y selected memory and a pair of the words designated as the Z pair in one memory designated as the Z memory. Memory select control 38, FIG. 7, derives signals SA, SB, SAY, SAZ, SBY and SBZ from the address presented by address bus 76 by means of port select controls 200 and 202 to provide for enabling gates to transfer signals to and from a Y and Z selected port. Port select controls 200 and 202 of memory select control 38, FIG. 7, receive the A8 address bit corresponding to the address lines A0–A23 of address bus 76 to control selecting a Y and Z memory for receiving the Y and Z pairs of words respectively, to be transferred. Since each of memories 20 and 22 connected to memory controllers 28–30 have a capacity of 32K word locations port select control 200 configuration switch 222 is set to a binary 0 position signifying that memory A connected to memory controller 28 will contain the address representing a location 0, with memory A to be selected to receive each Y pair of data words for addresses 0–32K. Configuration switch 222 for the port select control 202 will be set in the binary 1 position signifying that memory B connected to memory controller 30 will receive the Y pair of words for addresses representing locations 32K to 64K. For example, port select control 200, FIG. 8, upon receiving a binary 0 signal on address line A8 will have a binary 1 signal present at the output of inverter 240 for applying to 1 input of a first pair of inputs to exclusive OR-gate 228. The binary 1 signal from inverter 240 is inverted by inverter 242 to apply a binary 0 input as one input to a second pair of inputs to gate 228. A binary 0 input from configuration switch 222, is applied to the second input of the first pair of inputs to gate 228 with the binary 1 input from inverter 240 and the binary 0 signal inverter by inverter 244 for application with the binary 0 A8 signal to the second pair of inputs of gate 228. With unlike binary signal inputs to each pair of inputs to gate 228, a binary 1 output signal is provided by gate 228 which is applied to 1 input of a first pair of inputs of exclusive OR-gate 229 and inverter 246 for applying a binary 0 input as one input to a second pair of inputs of gate 229. Signals which are normally binary 0 signals and a binary 1 signal in this mode of operation are applied as second inputs to the first and second pairs of inputs respectively of gate 228. The unlike inputs to each pair of inputs to gate 229 result in providing a binary 1 output signal from gate 229 to one input of gate 250. The binary 1 output of gate 228 is inverted by two by inverter 246 for application also to gate 252. Gates 250 and 252 each receive a second input which is normally a binary 1 in this mode of operation, thereby enabling gate 250 to provide a SAY output signifying that the A port is selected as the port to receive the Y pair of data words. Gate 252 receives a binary 0 inverted output signal of gate 228 together with the binary 1 input to provide a binary 0 output signal identified as SAZ, indicating that the A port is not to receive the Z pair of data words.

The SAY signal is applied to OR-gate 212 to enable OR-gate 212 for providing a SA select A signal to one of gates 220, one of gates 218 to enable transmitting control signals QINT and QDPY through cable 70 to memory controller 28. The SAY signal is also applied to a set of 36 gates of gates 204 for transferring signals on lines of U bus 88 to 36 data lines of cable 70 connected to memory controller 28. The SAY signal is also applied to one of gates 216 for providing for the transfer of the QDA signals from memory controller 28 during the Y pair transfers. The SAY signals also apply to double precision control matrix 180 of main memory control 44, FIG. 9, to control generation of a QDPY signal during the case of transferring the second word of a Y pair of words to memory controller 28.

Port select control 202, having been selected as the control for port B, controls the transfer of information between memory controller 30 and extended memory controller 18, memory B will receive the Y pair of data words for addressed locations represented by addresses with numerical values between 32K and 64K. Configuration switch 222 will be set in the binary 1 position, thereby providing a binary 1 input signal from second reference potential 226 to port select control 202. With an address being applied to port select controls 200 and 202 representing a location between 0 and 32K, the A8 bit representing the A8 line of address bus 76 will provide a binary 0 input to port select control 202. With port select controls 200 and 202 being identical in structure, it is seen that the binary 0 input provided by bit A8 and binary 1 input provided from configuration switch 222, port select control 202 will function in a manner similar to that described for port select control 200 whereby like binary inputs are provided to all input pairs of gates 228 and 229 with both providing binary 0 output signals. The binary 0 output signal from gate 228 is inverted by inverter 246 to provide a binary 1 input to gate 252 in conjunction with a second binary 1 input to result in a binary 1 SBZ output signal from gate 252. The SBZ output signal will correspond to the SAZ signal shown in FIG. 8.

The binary 1 SBZ signal is applied to respective ones of gates 216, 206, 210 and OR-gate 214. The SBZ signal enables a set of 36 gates of gates 206 to enable transfer of data signals on the V bus lines 0–35 through a set of 36 gates of gate 206 to 36 data lines connected to memory controller B through cable 72. The SBZ signal is applied to a respective gate of gates 216, for applying the QDA pulse from a line of cable 72 to control bus 85. The SBZ signal is also applied to OR-gate 214 to provide an output signal identified as SB which is applied to respective gates of gates 218 and 220 to enable transmitting the QINT and QDPZ pulses to memory controller B through cable 72. Since port B is to receive the Z pair of data words, for transmitting to memory controller B through cable 72, the SBZ signal is applied to gate 183 in conjunction with a K counter state of providing an output signal from K and J decoder of K21 for enabling gate 183 to apply a binary 1 signal to address line A22 of address bus 76 for connection to memory controller B through cable 72. The binary 1 signal is derived from address line A22 of address bus 76 by means of inverting the binary 0 signal on address line A22 of address bus 76 through inverter 230 and applying the resulting binary 1 signal to gate 234 with the binary 1 output signal of gate 183 to enable gate 234 for providing a binary 1 signal to line A22 of the address lines connected through port B. The SBZ signal is also applied to control bus 85 for connection to double precision control matrix 180 of main memory control 44, FIG. 9, for providing a QDPZ pulse to memory controller B during the transfer of the second word of the Z pair of words transferred to memory controller B during a four word data transfer operation.

The waveforms of FIG. 10 illustrate that memory controllers 28 and 30 respond to the QINT pulse on line 82 as received in response to enabling each of gates 220 simultaneously to apply to the QINT pulse by means of cables 70 and 72 simultaneously to memory controllers 28 and 30 respectively. Memory controllers 28 and 30 each respond individually to provide a cycle started signal $TS internally to each memory controller for initiating a main memory access operation.

Following the cycle-started condition within memory controllers 28 and 30 the command and address lines are sampled. Controllers 28 and 30 next sample the signals present on the 36 lines of U bus 88 and V bus 87. Memory controller 28 provides for storing the first word of a pair of words from buffer registers 174 in a memory location of memory 20 specified by the address applied to memory controllers 28 and memory controller 30 provides for storing the first word of the pair of words in a location of memory 22 which corresponds to the separate address applied to memory controller 30. Since each memory controller can accept only 36 data lines at a time, extended memory controller 18 must transfer the four 36 bit words in buffer register 174 two words at a time (one word to each of memory controllers 28 and 30) and provide control for two parallel CWR,DP cycles of memory by each of memory controllers 28 and 30.

Each of memory controllers 28 and 30 following the sampling of the signals present on the 36 lines of U bus 88 and V bus 87 by transmitting a QDA signal which is received by gates 216 of memory select control 38 and applied through a gate selected by the SAY signal as a QDAY signal on line 90 and through a gate selected by the SBZ signal as a QDAZ signal on line 91. Memory controllers 28 and 30 operate asynchronously therefore the QDA signals received from each may be received at random times. The QDAY signal is applied to main control matrix 112 which provides a signal for decrementing J counter 114 from a J01 state to a J02 state and the QDAZ signal is applied in a similar manner to main control matrix 112 which generates a signal for decrementing the K counter from a state of K02 to K01.

The QDAY and QDAZ signals are also applied to transfer control matrix 156 with the K01 and J01 signals, which transfer control matrix 156 responds for applying QCBU and QDBV signals to data output gates 41 for selectively enabling two sets of 36 data output gates for applying signals from second and fourth registers of the buffer registers 174 to U bus lines 88 and V bus 87 respectively. The QDAY, RDY, J02 and SAY signals are applied conjunctively to double precision control matrix 180 to provide a QDPY signal on line 78 to memory select control 38. The QDPY signal on line 78 is then applied to gates 218 in conjunction with the SA signal to enable one of gates 218 for applying a QDPY signal through cable 70 to memory controller 28 indicating that a second data word is now present on the 36 data lines to memory controller 28. The QDAZ, RDY, K02, and SBZ signals are applied to the double precision control matrix 180 which responds to provide a QDPZ signal on line 79 for applying to memory select control 38. The QDPZ signal is applied to gates 218 in conjunction with the SB signal to enable one of gates 218 for applying a QDPY signal through cable 72 to memory controller 30 indicating that a second data word is now available on the data lines to memory controller 30. Memory controllers 28 and 30, following the sampling of data signals present on lines of cables 70 and 72 respectively, transmit a second QDAY and QDAZ signal to extended memory controller 18. The second QDAY and QDAZ signals are again transferred by separate ones of gates 216 enabled by the SAY and SBZ signals to main memory control 44 and applied to main control matrix 112 for decrementing the K and J counters to states of K00 and J00 respectively.

The QDAY and QDAZ signals are applied to address count control matrix 158 with the J01, K01 signals from K and J decoder 118 to provide output signals for resetting the FFY and FFZ flip-flops to their reset states. Address count control matrix 158 responds to the QDAY, J01 and RDY signals to provide a signal for resetting the FFY flip-flop. Matrix 158 responds to the QDAZ, K01 and RDY signal to reset the FFZ flip-flop. With the FFY and FFX flip-flops in their binary 0 or reset states, binary 1 output signals from the 0 outputs of FFY and FFZ are applied to gate 184 which is enabled to provide a QACT signal which is applied to main control matrix 112, DCW register decoder 46. A register, and interrupt control matrix 110. The QACT signal applied to A register 114 of DCW register decoder 46, FIG. 6, increments the A register by a count of four. Following a predetermined delay extended memory 36 has completed reading four additional words from extended memory 36 and buffer registers 174 are filled requiring a new four word transfer operation between extended memory controller 18 and memory controllers 28 and 30. Extended memory 36 transmits a signal designated as $P_8$ to extended memory controller 18 signifying that the buffer registers are full. The $P_8$ signal is applied to main control matrix 112 in conjunction with the Q34 and RDY signals for generating a signal to preset the K and J counters to a state of K02 and J02. The $P_8$, Q34 and RDY signals are also applied to interrupt control matrix 110 to generate a QINT signal. The QINT signal is present on line 82 for applying to memory select control 38. Gates 220 of memory select control 38 which were enabled by the SA and SB signals from gates 212 and 214 apply the QINT signal to lines of cables 70 and 72 for connection to memory controllers 28 and 30. Memory controllers 28 and 30 respond to the QINT signal to provide for a double precision two word storage operation as previously described. At each successive QACT signal the extended memory controller 18 responds to increment the address applied to memory controllers 28 and 30 and responds to the $P_8$, Q34 and RDY signals to generate interrupt signals to request successive main memory storage accesses.

Following the reading and entering of a total of 64 data words into buffer registers 174 from extended memory 36, memory 36 provides a signal designated as Q05 to main memory control 44 and terminates the Q34 signal indicating the end of reading data from the addressed location of extended memory 36. Prior to receiving the Q05 signal, the Q34, $P_8$ and RDY signals have initiated main memory control 44 operation for storing the last four words entered in buffer registers 174 in memories A and B. Following completion of the storage operations by memory controllers 28 and 30, the FFY and FFZ flip-flops are again in the reset state providing output signals from their 0 outputs to enable gate 184 for providing a QACT signal to main control matrix 112, interrupt control matrix 110 and DCW register decoder 46. The QACT signal to DCW register decoder 46 again increments the A register 144 by a count of four, however, the incremented address is not utilized for future addressing since the read operation has been terminated. The QACT signal applied to main control matrix 112 in conjunction with the Q05 signal enables main control matrix 112 to provide a signal to preset J counter 114 to a J05 state, K and J decoder 118 then provides a J05 signal for controlling a memory access operation during which a DCW is retrieved from main memory, an understanding of which is not material to an understanding of this invention. At the completion of memory access operation provided by the J05 state of the J counter, the J05 signal is applied, to main control matrix 112 which, in conjunction with a QDAY signal, resulting from the main memory access operation, presets the J counter to a counter of J03 for performing the housekeeping function previously described as not being material to an understanding of this invention.

If a binary configuration of 11010 is present in F register 152 following the supply of a DCW and the A and S registers store data corresponding to addresses received as a result of receiving a DCW, control of execution of a write operation is provided. The output of the F decoder 154 provides a WRY signal which is applied to main control matrix 112 in conjunction with J03 and K00 signals from the K and J decoder 118 and a QDAY pulse received as a result of the housekeeping operation, requiring a main memory access in response to a J counter state of J03.

The WRY, J03 and QDAY signals are applied to the address count control matrix 158, FIG. 9, to generate signals setting flip-flops FFY 160 and FFZ 162 to their binary 1 states. The J03, WRY and QDAY signals are applied in a similar manner to interrupt control matrix 110 of FIG. 9 to generate a QINT pulse for applying on line 82 through control bus 85 to memory select control 38 to request a main memory access. Conjunctively the J03, QDAY and WRY signals are also applied to main control matrix 112 which responds to provide a signal for presetting the J and K counters to their respective J02 and K02 states. With the J and K counters respectively preset to states J02 and K02, K and J decoder 118 provides binary 1 output signals designated as K21 and J21 and K21 signals and a WRY signal, encoder 122 generates 5 signals which are applied to lines 80 to provide a binary coded signal combination of 10001 representing a RRS, DP command to memory select control 38. J21 and K21 signals are also applied by means of lines 120 to enable OR-gate 173, FIG. 6, to provide a binary 1 signal for enabling gates 116 during the presence of a J21 or K21 binary 1 signal. Enabled gates 116 provide for transferring signals from A register 144 representing the main memory address to lines of address bus 76 for application to memory select control 38. If an address representing a location between 0 and 32,767 is provided on address bus 76, port select controls 200 and 202 respond as previously described to provide output signals SAY and SBZ respectively. Gates 212 and 214 also provide SA and SB signals as previously described. The SAY signal enables a set of 36 gates of gates 208, FIG. 7, to provide for connecting the 36 lines of output data lines of cable 70 from memory controller 28 to N bus 74. SBZ is applied to a set of 36 gates of gates 210 to enable the transfer of signals present on 36 output data lines of cable 72 from memory controller 30 to be transferred to P bus 75. SAY and SBZ signals are applied as previously described, to the main control bus 85 to control main memory control 44. SAY and SBZ signals are also applied to gates 216 to provide for transferring control signals to control bus 85 as previously described. SBZ is also applied to gate 183 to provide for applying a binary 1 signal to address line A22 for deriving two separate addresses as previously described. The SA and SB signals are applied to gates 218 and 220 to enable the transfer of the control signals between control bus 85 and interconnecting cables 70 and 72 connected to memory controllers 28 and 30 as previously described. Gates 218 provide for simultaneously transmitting the QINT signal to both of memory controllers 28 and 30.

With reference to the waveforms illustrated in FIG. 10 for a RRS, DP command, it is seen that following the simultaneous transmittal of the QINT signal, a cycle started signal designated as $TS is generated internally to each of memory controllers 28 and 30. After memory controllers 28 and 30 have utilized the command and address signals to initiate a retrieval operation by each of memories 20 and 22, the first of a pair of words are transmitted by means of cables 70 and 72 to memory select control 38. The signals present on the output data lines of cables 70 and 72 are then connected by means of separate sets of 36 enabled gates of gates 208 and 210 to N bus 74 and P bus 75 respectively. Following retrieval of the first word from each of memories 20 and 22 a QDA signal is applied from memory controllers 28 and 30 respectively by means of cables 70 and 72 to memory select control 38. Gates of 216 which are enabled by the SAY and SBZ signals provide for transfer of the QDA signal as a QDAY on line 90 and a QDAZ form memory B on line 91 to main memory control 44. The QDAY and QDAZ signals signify that signals representing the first data word retrieved from each of memories 20 and 22 have been applied to the N bus 74 lines 0–35 and P bus 75 lines 0–35 for transfer into the first and third registers respectively of buffer registers 174.

With J02, WRY and QDAY signals applied to transfer control matrix 156, a QNC0 signal is applied by means of lines 186 to data input gates 40. The QNC0 signal applied to data input gates 40 enables a set of 36 gates to provide for transferring signals representing the 36 bit data word from N bus 74 to the first register of buffer registers 174. The K02, WRY and QDAZ signals are applied to transfer control matrix 156 which responds to provide a QPDO signal for application by means of lines 186 to data input gates 40. The QPDO signal applied to data input gates 40 enables a set of 36 gates to provide for transferring signals representing a 36 bit data word from P bus 75 to a third register of buffer registers 174. The WRY, J02 and QDAY signals are also applied to main control matrix 112 which responds to provide a signal for decrementing the J counter to a J01 state. The WRY, K02 and QDAZ signals are also applied to main control matrix 112 which responds to provide a signal for decrementing the K counter to a K01 state. Memory controllers 28 and 30 automatically provide a second QDA signal to extended memory controller 18 on lines 70 and 72 respectively when signals representing the second word retrieved from each of memories 20 and 22 are present on 36 lines designated as output lines of cables 70 and 72 respectively. Specific sets of 36 gates within gates 208 and 210 are enabled by the SAY and SBZ signals to provide for transferring the 36 data signals present on 36 output data lines of cables 70 and 72 to N bus 74 and P bus 75 respectively. The J01, WRY and QDAY signals are applied to data transfer control matrix 156 which responds to provide a QNC5 signal which is applied by means of lines 186 to data input gates 40. The K01, WRY and second QDAZ signals are applied to data transfer control matrix 156 which responds to provide a QPD5 signal which is applied by means of lines 186 to data input gates 40. Separate sets of 36 gates each within data input gates 40 respond to the QNC5 and QPD5 signals to transfer signals corresponding to the second 36 bit data words retrieved from each of memories 20 and 22 from N bus 74 and P bus 75 respectively for entering into second and fourth registers of buffer registers 174. The J01, QDAY, K01 and QDAZ signals are also applied to main control matrix 112 which generates a signal for decrementing the J counter 114 and K counter 115 to states of J00 and K00 respectively. The J01, QDAY and QDAZ signals are applied to address count control matrix 158 to reset flip-flops FFY 160 and FFZ 162 to their binary 0 states respectively. With flip-flops FFY 150 and FFZ 162 both in their binary 0 states their binary 0 outputs are applied to AND-gate 184 which provides a QACT signal. The resulting QACT signal is applied to the A register flip-flop providing the signal applied to line A21 for incrementing the data address contained in the A register by a count of 1 which automatically increases the representative address signals present on address bus 76 by a count of four.

Extended memory 36 provides signals designated as Q34 and $P_6$ representing the time at which extended memory controller 18 is to start transferring the four data words stored in buffer registers 174 for writing in extended memory 36. The Q34 and $P_6$ signals are applied to main control matrix 112 and interrupt control matrix 110 in conjunction with the WRY signal. Main control matrix 112 responds to WRY, Q34 and $P_6$ signals to provide signals for setting J and K counters 114 to states of K02 and J02 respectively.

The Q34, $P_6$ and WRY signals are applied to interrupt control matrix 110 which responds to provide a QINT signal on line 82 of control bus 85 for applying to memory select control 38. The QINT signal is simultaneously applied by means of memory select control 38, in the manner previously described, to memory controllers 28 and 30 for simultaneously requesting access to memories 20 and 22 for the retrieval of two additional words from each of memories 20 and 22. The retrieval of two words from each of memories 20 and 22 and transfer to buffer registers 174 of extended memory controller 18 is performed in the manner previously described. With each $P_6$ signal the retrieval of two more words from each one of memories 20 and 22 is provided until a total of 64 data words are transferred between memories 20 and 22 and extended memory 36. Upon reaching an end of data portion of the location addressed by the address contained in the S register, extended memory 36 transmits a Q05 signal representing the end of writing data to main memory control 44 and terminates applying the Q34 signal. Following the end of writing data signal, extended memory 36 transmits a signal designated as $P_0$ representing a write operation completion which is applied to main control matrix 112. The $P_0$ and Q05 signals conjunctively are applied to main control matrix 112 which responds to preset the J counter to a state of J05. During the J05 state of the J counter an operation requiring a memory access for retrieval of a DCW is performed, and followed by the setting of the J counter to a J03 state to provide for a housekeeping operation as previously described.

Memory select control 38 provides the function of selectively coupling the data, address, and control busses to ports A and B for providing data and control signal transmission between memory controllers 28 and 30 and extended memory controller 18. Memory select control 38 provides additional control for controlling memory controllers 28 and 30 for accessing memory locations represented by addresses 32,768 to 65,535 in a similar manner to that described for controlling memory controllers 28 and 30 for accessing storage locations in memories 20 and 22 corresponding to locations represented by addresses 0–32,767. With reference to FIG. 2, a representation of the interleaving of consecutive addresses between memories A and B is provided. Memory select control 38 provides for accessing memory B during transfer of the Y pair of data words and accessing memory A during transfer of the Z pair of data words. For memory locations with addresses which are represented by addresses greater than 32,767, address bit A8 is a binary 1. A binary 1 signal is therefore provided by address bit A8 to port select controls 200 and 202, FIG. 8, with configuration switch 222 of control 202 set to the binary 1 position and switch 222 of control 200 set to the binary 0 position and switch 222 of control 200 set to the binary 1 position as previously described. The binary 1 input applied by configuration switch 222 of port select control 202 is compared with the binary 1 input of $A_8$ by gate 228. A first pair of input signals to gate 228 is comprised of the binary 1 signal from configuration switch 222 and a binary 0 signal provided by inverter 240 as a result of inversion of the binary 1 $A_8$ signal. A second of a pair of inputs to gate 228 is provided by the binary 1 $A_8$ signal by means of double inversion provided by inverters 240 and 242 and a binary 0 signal provided by inverter 244 as a result of inversion of the binary 1 signal from configuration switch 222. With unlike inputs, gate 228 provides a binary 1 output signal which is applied directly as one input to a first pair of inputs to gate 229 with the other input signal to the first pair normally a binary 0 in this mode of operation. A second pair of inputs comprises a binary 0 signal resulting from inversion of the binary 1 output of gate 228 through inverter 246 and a signal which is normally a binary 1 in this mode of operation. With unlike inputs applied to both pairs of inputs to gate 229, a binary 1 output signal is applied to gate 250 in conjunction with a signal which is normally a binary 1 at the other input of gate 250 to provide a positive output signal corresponding to SBY. The binary 1 output signal from gate 228 is inverted through inverter 246 for application to gate 252 with a signal which is normally a binary 1 signal in this mode of operation, whereby gate 252 provides a 0 output signal representing SBZ. In this manner port select control 202 provides a binary 1 SBY output signal for selecting memory port B for transferring the Y pair of data words between memory B and extended memory 36 for locations represented by addresses with numerical values 32,768 to 65,335.

Signals to the input of port select control 200 for selecting port A will be a binary 1 input signal from $A_8$ and a binary 0 signal in the input of configuration switch 222. The binary 0 input signal from configuration switch 222 is applied as one input to a first pair of inputs of the gate 228 with the second input of the first pair of inputs of the gate 228 with the second input of the pair being a binary 0 signal resulting from inversion of the inverted binary 1 $A_8$ signal inverted by inverter 240. The second pair of inputs to gate 228 is provided by the binary 0 input signal from configuration switch 222 inverted through inverter 244 to provide a binary 1 input and a binary 1 input signal from the $A_8$ line through the double inversion provided by inverters 240 and 242. With like inputs to both pairs of inputs of gate 228, the output from gate 228 is in a binary 0 signal. The binary 0 signal is applied to a first pair of inputs of gate 229 with a second input of the first pair being a signal which is normally a binary 0 in this mode of operation. One input to a second pair of inputs to gate 229 is provided by the binary 0 output from gate 228, inverted through inverter 246 to provide a binary 1 input and the other input being a signal which is normally a binary 1 in this mode of operation. With like inputs to each pair of inputs to gate 229 a binary 0 output signal is applied as one input to gate 250 and since the second input to gate 250 is a normally binary 1 signal in this mode of operation, the SAY output signal is a binary 0. The binary 0 signal of the output of gate 228 is inverted by inverter 246 to provide a binary 1 input signal to gate 252 in conjunction with an input signal which is normally a binary 1 signal in this mode of operation. Gate 252 having two binary 1 inputs therefore provides a binary 1 SAZ output signal. The SAZ binary 1 output signal provides for selecting the A port as the port designated to transfer the Z pair of data words between memory A and extended memory controller 18.

Port select controls 200 and 202 therefore provide outputs SAZ and SBY to enable gates 212 and 214 respectively for providing the SA and SB output signals as previously described. The SA and SB signals simultaneously enable gates 218 to apply interrupt signals QINT to a line of each of cables 70 and 72 respectively. The SAZ signal and SBY signals control gates 208 and 210 to provide for selectively transferring the data words received from memory controllers A and B through cables 70 and 72 to P bus 75 and N bus 74 respectively. With memory A selected to provide the Z pair of words, a set of 36 gates within gates 210 are enabled by the SAZ signal to apply output data signals of cable 70 to P bus 75 instead of to N bus 74 as previously described when memory A provided the Y pair of words. With memory B selected to provide the Y pair of words the output data signals on lines of cable 72 are applied through gates 208 to N bus 74 by means of a set of 36 gates enabled by the SBY signal. The SBY and SAZ signals enable sets of 36 gates each of gates 204 and 206 to selectively enable applying the U bus signals to lines of cable 72 and V bus signals to lines of cable 70. The SAZ signal enables applying the QDA signal from a line of cable 70 and memory controller A as the QDAZ signal to control bus 85 whereas the SBY signal similarly enables gates 216 to supply the QDA signal from a line of cable 72 and memory controller B as the QDAY signal to control bus 85. The SAZ signal is also applied to gate 182 in conjunction with K21 signal to provide for applying a binary 1 signal from inverter 230 through gate 234 to address line A22 applied to the cable 70 for addressing memory A locations corresponding to addresses with higher numerical value during transfer of the Z pair of words.

During the time that the A memory is selected to receive the Z pair of data words being transferred, the SBY and SAZ signals are also applied to control bus 85 and subsequently to main memory control 44 and double precision control matrix 180. Double precision control matrix 180 responds to the SAZ, J02, RDY and QDAZ signals to provide a QDPY signal on line 78 of control bus 85 for applying to gates 218 of memory select control 38. Double precision control matrix 180 responds to the SBY, K02, RDY and QDAY signals to provide a QDPZ signal on line 79 of control bus 85 for applying to gates 218 of memory select control 38. Thus the SAY and SAZ signals are utilized by double precision control matrix to provide a QDPY signal for applying to gates 218 for connection to cable 70 for memory controller A and the SBY and SBZ signals are utilized by double precision control matrix 180 to provide a QDPZ signal for applying to gates 218 for connection to cable 72 for memory controller B. In an example with the A memory being selected to retrieve or store the Z pair of data words a QDA signal received from the A memory is utilized to derive a QDAZ signal for controlling the K counter during the transfer of the Z pair of data words to or from memory A.

In the manner described, memory select control 38 and port select controls 200 and 202 provide for the simultaneous transmission of the QINT signal representing a request for access to each of memory controllers A and B and for assigning consecutive addresses which are interleaved between memories A and B for addresses representing numerical values 0–32,767 as well as those addresses representing numerical values 32,768 to 65,535.

While the principles of the invention have been made clear in an illustrative embodiment there will be immediately obvious to those skilled in the art many modifications of structure, arrangement, proportions, the elements, materials and components used in the practice of the invention and otherwise which are particularly adapted for specific environments and operating requirements without departing from those principles. The appended claims are therefore intended to cover and embrace any such modifications within the limits only of the true spirit and scope of the invention.

We claim:

1. A storage control system comprising: a plurality of storage means, each of said storage means having accessible locations and being independently controllable to provide access to said locations; control means for controlling said storage means to provide said access; means for selectively coupling a set of selected ones of said storage means to said control means; means for simultaneously transmitting an interrupt signal to all of the storage means of said set, said signal representing a request for access to said locations; and all of said storage means of said set being responsive to said signal to provide access to said locations.

2. A storage control system comprising: a plurality of storage means, each of said storage means having accessible locations and being independently controllable to provide access to said locations; a plurality of communication means for transferring a control signal, each one of said communication means coupled to a corresponding one of said storage means; control means for controlling said storage means for providing said access; means for selectively coupling a set of individual ones of said communication means to said control means; means for simultaneously transmitting an interrupt signal to each of said individual ones of said set, said signal representing a request for access to said locations; and each of said storage means corresponding to said individual ones of said communication means being responsive to said interrupt signal to provide access to said locations.

3. A storage control system comprising: a plurality of storage means, each of said storage means having addressable locations and being independently controllable to provide selective access to said locations; a source of control words, each of said control words having an address field, said address field representing a location in said plurality of storage members; control means for receiving a control word and being responsive to said address field for transmitting an address signal set, said address signal set representing a location in one of said plurality of storage members; means for transferring a control word from said source to said control means; selection means coupled to said control means to receive said signal set and being responsive to said signal set to selectively couple selected ones of said plurality of storage means to said control means; said control means being operable following receiving a control word for simultaneously transmitting an interrupt signal to each of said selected ones, said interrupt signal representing a request for access to said locations; and each of said storage means being responsive to said interrupt signal to provide access to said location represented by said address field.

4. A storage control system comprising: a plurality of storage means, each of said storage means having addressable locations being adapted to store data words and being independently controllable to perform selectively the storage operations of entering data words into and retrieving data words from said locations; a source of control words, each of said control words having an address field and a function code, said address field representing a location in said plurality of storage means and said function code representing one of said storage operations; control means for receiving said control words, said control means responsive to said address field for transmitting an address signal set; means for transferring a control word from said source to said control means; selection means coupled to said control means for receiving said address signal set and being responsive to said signal set for selectively coupling a set of individual ones of said storage means to said control means; said control means being operable following receiving each of said control words for simultaneously transmitting an interrupt signal to each of said individual ones of said storage means, said interrupt signal representing a request for access to said locations, said control means being responsive to said function code to transmit a command signal, said command signal representing one of said storage operations; and each of said individual ones of said storage means being responsive to said interrupt signal to establish access to said locations and being responsive to said command signal to perform the storage operation represented by said function code.

5. A storage control system comprising: a plurality of storage means, each of said storage means having addressable locations, each one of said locations being adapted for storing a data word and each of said storage means being independently controllable to provide access to said locations and to perform selectively the storage operations of entering data words into and retrieving data words from said locations; control means responsive to a control word representing one of a plurality of different types of transfer operations for controlling the transfer of said data words for implementing said storage operations, said control word including an address field and a function code, said address field representing a location in one storage means of a set of said storage means, said function code representing a transfer operation; a buffering means for temporarily storing said data words; a plurality of data transmission means for transferring data words between each of said storage means and said buffering means, each one of said transmission means coupled to a respective one of said plurality of storage means and corresponding to a respective one of said plurality of storage means; a source of control words for supplying control words to said control means; means for coupling each one of said set of storage means to said control means; said control means coupled to said source for receiving said control words and being operable following receiving each control word for simultaneously transmitting an interrupt signal to all of the storage means of said set, said interrupt signal representing a request for access to a location in each one of said set of storage means, said control means being responsive to said address field to transmit an address signal set, said address signal set representing a location in one of said set of storage means and being responsive to said function code to transmit a command signal to each of said plurality of storage means and to transmit a function signal, said command signal representing the type of storage operation to be performed by said set of storage means and said function signal representing a type of transfer operation; all of the storage means of said set being independently responsive to said interrupt signal to respond to said command signal to perform a storage operation for effecting the transfer operation represented by said function code; and selector means coupled to said control means to receive said address signal set and said function signal and being responsive to said address signal set and said function signal to selectively couple said transmission means to said set of storage means and to said buffer means to effect the transfer of data words between said buffer means and said set of storage means for implementing the storage operation being performed by said set of storage means.

6. A storage control system comprising: a plurality of storage means, each of said storage means having addressable locations and being independently controllable to provide selective access to said locations; control means coupled to each of said storage means for simultaneously transmitting a plurality of different address signal sets, each of said signal sets being transmitted to a respective one of said storage means and being representative of a location in a respective one of said storage means; and each of said storage means being responsive to a respective one of said signal sets to provide access to the location represented by a respective one of said signal sets.

7. A storage control system comprising: a plurality of storage means, each of said storage means having addressable locations adapted to store information, being controllable to provide selective access to said locations, and being controllable to perform the storage operations of entering information into and retrieving information from said locations; control means coupled to each of said storage means for simultaneously transmitting a plurality of address signal sets and a command signal, said signal sets being transmitted to respective ones of said storage means and being representative of a location in a respective one of said storage means, said command signal being transmitted to all of said storage means and being representative of one of said storage operations; information transfer means coupled to all of said storage means for transmitting information to and receiving information from said storage means; and each of said storage means being responsive to a respective one of said signal sets and said command signal to perform the storage operation represented by said command signal at the location represented by a respective one of said signal sets, and each of said storage means transmitting information to and receiving information from said transfer means to implement the storage operation represented by said command signal.

8. A storage control system comprising: a plurality of storage means, each of said storage means having addressable locations adapted to store information, being controllable to provide selective access to said locations, and being controllable to perform the storage operations of entering information into and retrieving information from said locations; control means coupled to each of said storage means for transmitting a plurality of different address signal sets and a command signal, said signal sets being transmitted to respective ones of said storage means and being representative of a location in a respective one of said storage means, said command signal being transmitted to all of said storage means and being representative of one of said storage operations; information transfer means coupled to all of said storage means for transmitting information to and receiving information from said storage means; each of said storage means being responsive to a respective one of said signal sets and said command signal to perform the storage operation represented by said command signal at the location represented by a respective one of said signal sets, and each of said storage means transmitting information to and receiving information from said transfer means to implement the storage operation represented by said command signal.

9. A storage control system comprising: a plurality of storage means, each of said storage means having addressable locations adapted to store information, being controllable to provide selective access to said locations, and being controllable to perform the storage operations of entering information into and retrieving information from said locations; control means for controlling each of said storage means to provide said access and to perform said storage operations; means for selectively coupling a set of selected ones of said storage means to said control means; said control means being operable for simultaneously transmitting a different address signal set and a command signal to each of the storage means of said set, said signal sets being representative of a location in a respective one of said selected ones and said command signal being representative of one of said storage operations; information transfer means coupled to all of said storage means of said set of selected ones for transmitting information to and receiving information from said storage means; and each of said selected ones being responsive to a respective one of said signal sets and said command signal to perform the storage operation represented by said command signal at the location represented by a respective one of said signal sets, and each of said storage means transmitting information to and receiving information from said transfer means to implement the storage operation represented by said command signal.

10. A storage control system comprising: a plurality of storage means, each of said storage means having addressable locations and being independently controllable to provide selective access to said locations; control means for controlling each of said storage means to provide said access; means for selectively coupling a set of selected ones of said storage means to said control means; said control means being operable for simultaneously transmitting a different address signal set to each of the storage means of said set, each one of said address signal sets representing a location in a respective one of the storage means of said set; and each one of the storage means of said set being responsive to a respective one of said address signal sets to provide access to said locations.

11. A storage control system comprising: a plurality of storage means, each of said storage means having a plurality of addressable locations and being independently controllable to provide selective access to said locations; control means responsive to a control word for controlling said storage means to provide said access, said control word including an address field, said address field being representative of an addressable location in one of said plurality of storage means; means for selectively coupling a set of said plurality of storage means to said control means; a source of control words for supplying control words to said control means; said control means coupled to said source for receiving said control words and being responsive to said address field for simultaneously transmitting a separate address signal set to each one of the storage means of said set, each of said separate address signal sets being derived from said address field and providing a representation of a numerical address of a different location, said signal sets providing representations of addresses which differ by a predetermined number; and all of the storage means of said set being responsive to a respective one of said signal sets to provide access to the locations represented by a respective signal set.

12. A storage control system comprising: a plurality of storage means, each of said storage means having addressable locations, each of said locations being adapted for storing a data word and each of said storage means being independently controllable to provide access to said locations and to perform selectively the storage operations of entering data words into and retrieving data words from said locations; control means responsive to a control word representing one of a plurality of different transfer operations for controlling said storage operation, said control word including an address field and a function code, said address field representing a location in one of said plurality of storage means, said function code representing a transfer operation; a buffering means for temporarily storing data words to be entered into said locations and data words retrieved from said locations; a plurality of transmission means for transferring data words between each of said storage means and said buffering means, each one of said transmission means coupled to a respective one of said plurality of storage means and corresponding to a respective one of said plurality of storage means; selection means for selectively coupling said storage means to said control means and said transmission means to said buffering means; means for supplying a control word to said control means; said control means being responsive to said address field to derive a numerical address representing a location in one of said storage means and to transmit an address signal set representing said address to said selection means; said selection means being coupled to said control means to receive said address signal set and being responsive to said address signal set to selectively couple a set of said plurality of storage means to said control means and a set of transmission means corresponding to said set of storage means to said buffering means; said control means being responsive to said address field to simultaneously derive a set of separate addresses, each of said addresses representing a location in a respective one of said set of storage means, said control means being responsive to each of said addresses to simultaneously transmit a separate address signal set to each storage means of said set of storage means, each of said separate address signal sets representing one of said separate addresses and each of said addresses representing a location in a respective one of said set of storage means, said control means being responsive to said function code to transmit a command signal to each of said storage means, said command signal representing a storage operation and being further responsive to said function code to transmit a function signal, said function signal representing a type of transfer operation; each storage means of said set being independently responsive to said command signal to perform a storage operation for effecting the transfer operation represented by said function code; said selection means coupled to said control means to receive said function signal and being responsive to said function signal to effect the transfer of a predetermined number of data words between said buffering means and each storage means of said set for implementing the storage operation being performed by each one of said set of storage means; said control means being operable following the transfer of said predetermined number of data words between said buffering means and each storage means of said set for simultaneously incrementing the numerical value of the address represented by each of said signal sets by a number depending upon the number of data words transferred to each storage means of said set.

13. A storage control system comprising: a plurality of storage means, each of said storage means having addressable locations, each of said locations being adapted for storing a data word and each of said storage means being independently controllable to provide access to said locations and to perform selectively the storage operations of entering data words into and retrieving data words from said locations; control means responsive to a control word representing a storage operation for controlling said storage operations, said control word including an address field and a function code, said address field representing a location in said plurality of storage means, said function code representing a storage operation; a plurality of independent communication means for transferring control signals, each one of said communication means corresponding to a respective one of said storage means and coupled to said respective one; a source of control words for supplying control words to said control means; means for coupling a set of said communication means to said control means; said control means coupled to said source for receiving said control words and operable following receiving each control word to simultaneously transmit an interrupt signal to each of said storage means of said set of storage means corresponding to said set of communication means, said interrupt signal representing a request for access to said locations, said control means being responsive to said address field to transmit an address signal set to each of one of said set of storage means, said address signal set representing a location in each of said storage members of said set, said control means being responsive to said function code to transmit a command signal, to each of said storage members, said command signal representing a storage operation to be performed by said storage means; each of said storage means of said set of storage means being responsive to said interrupt signal and an address signal set to establish access to the location represented by an address signal set and being responsive to said command signal to perform the storage operation represented by said function code.

14. A storage control system comprising: a plurality of storage means, each of said storage means having addressable locations, each of said locations being adapted for storing a data word and each of said storage means being independently controllable to provide access to said locations and to perform selectively the storage operations of entering data words into and retrieving data words from said locations; control means responsive to a control word representing a storage operation for controlling said storage operations, said control word including an address field and a function code, said address field representing a location in one of a set of said storage means, said function code representing a storage operation; a plurality of independent communication means for transferring control signals, each one of said communication means corresponding to a respective one of said storage means and coupled to said respective one; a source of control words for supplying control words to said control means; means for coupling a set of said communication means to said control means; said control means coupled to said source for receiving said control words and operable following receiving each control word for simultaneously transmitting an interrupt signal to each of said storage means of said set of storage means corresponding to said set of communication means, said interrupt signal representing a request for access to said locations, said control means being responsive to said address field to simultaneously transmit an address signal set to each of said set of storage means following the transmitting of said interrupt signal, each of said address signal sets representing a different numerical address and each address representing a different location, said signal sets representing addresses which differ by a predetermined numerical value, said control means being responsive to said function code to transmit a command signal to each of said storage members, said command signal representing a storage operation to be performed by said storage means; each of said storage means of said set of storage means being responsive to said interrupt signal and an address signal set to establish access to the location represented by an address signal set and being responsive to said command signal to perform the storage operation represented by said function code.

15. The storage control system of claim 14 wherein said predetermined numerical value is two.

16. A storage control system comprising: a plurality of storage means, each of said storage means having addressable locations, each of said locations being adapted for storing a data word and each of said storage means being independently controllable to provide access to said locations and to perform selectively the storage operations of entering the data words into and retrieving data words from said locations; control means responsive to a control word representing a storage operation for controlling said storage operations, said control word including an address field and a function code, said address field representing a location in one of a set of said storage means, said function code representing a storage operation; a buffering means for temporarily storing said data words; a plurality of data transmission means for transferring data words between each of said storage means and said buffering means, each one of said transmission means coupled to a respective one of said plurality of storage means and corresponding to a respective one of said plurality of storage means; a selection means for selectively coupling individual ones of said transmission means to said buffering means and individual ones of said storage means to said control means; means for supplying a control word to said control means; said control means being responsive to said address field for transmitting an address signal set to said selection means, said address signal set providing a numerical address of the location represented by said address field; said selection means being coupled to said control means to receive said address signal set and being responsive to said address signal set to couple a set of said transmission means to said buffering means and to couple a set of storage means corresponding to said set of transmission means to said control means; said control means being operable following receiving said control word to simultaneously transmit an interrupt signal to each one of said set of storage members, said interrupt signal representing a request for access to said locations, said control means being further responsive to said address field to simultaneously transmit a plurality of address signal sets, one of said address signal sets being transmitted to each one of said set of storage means, each of said address signal sets providing a numerical address representing a different location, one of said address signal sets providing an address representing the location represented by said address field and each of the remaining address signal sets of said plurality of address signal sets providing an address derived from said address field by simultaneously incrementing the address represented by said address field by a predetermined numerical value prior to the simultaneous transmittal of said signal sets, each of said remaining signal sets providing addresses of locations represented by the incremented addresses, said control means being responsive to said function code to transmit a command signal set to each of said storage means, said command signal set representing a storage operation and being further responsive to said function code to transmit a function signal, said function signal representing a type of transfer operation; each one of said set of storage means being independently responsive to said interrupt signal to respond to said command signal set and an address signal set to perform a storage operation at the location represented by an address signal set for effecting the transfer operation represented by said function code; said selection means coupled to said control means to receive said function signal and being responsive to said function signal to effect the transfer of a predetermined number of data words between said buffering means and each storage means of said set of storage means for implementing the storage operation being performed by each storage means of said set of storage means; said control means being operable following the transfer of a predetermined number of data words between said buffer means and each storage means of said set of storage means for simultaneously transmitting a next interrupt signal and simultaneously incrementing the numerical value of all of the addresses represented by said address signal sets by a number depending upon the number of data words transferred to each storage means of said set.

17. A storage control system comprising: a plurality of storage means, each of said storage means having addressable locations and being independently controllable to provide selective access to said locations; control means coupled to each of said storage means for simultaneously transmitting an interrupt signal to each of said storage means, said interrupt signal representing a request for access to said locations; said control means further simultaneously transmitting a plurality of different address signal sets, each one of said signal sets being transmitted to a different one of said storage means and representing a location in a different one of said storage means; each of said storage means being responsive to said interrupt signal and a respective one of said signal sets to provide access to the location represented by said respective one of said signal sets.

18. A storage control system comprising: a plurality of storage means, each of said storage means having addressable locations adapted to store data words, being independently controllable to provide selective access to said locations, and being controllable to perform the storage operations of entering information into and retrieving information from said locations; control means coupled to each of said storage means for simultaneously transmitting an interrupt signal, a different address signal set and a command signal to each of said storage means, said interrupt signal representing a request for access to said locations, said address signal set being representative of a location in a respective one of said storage means and said command signal being representative of one of said storage operations; information transfer means coupled to each of said storage means for transmitting information to and receiving information from said storage means; and each of said storage means being responsive to said interrupt signal, a respective signal set, and said command signal to perform the storage operation represented by said command signal at the location represented by said respective signal set, and each of said storage means transmitting information to and receiving information from said transfer means to implement the storage operation represented by said command signal.

References Cited

UNITED STATES PATENTS

| | | | |
|---|---|---|---|
| 3,242,467 | 3/1966 | Lamy | 340—172.5 |
| 3,323,109 | 5/1967 | Hecht et al. | 340—172.5 |
| 3,343,140 | 9/1967 | Richmond et al. | 340—172.5 |
| 3,395,392 | 7/1968 | Kulikauskas et al. | 340—172.5 |
| 3,436,734 | 4/1969 | Pomerene et al. | 340—172.5 |
| 3,440,616 | 4/1969 | Aranyi et al. | 340—172.5 |

GARETH D. SHAW, Primary Examiner